March 29, 1949. H. T. SPARROW 2,465,759
AIRCRAFT PRESSURE CONTROL SYSTEM
Filed June 22, 1944 3 Sheets-Sheet 1
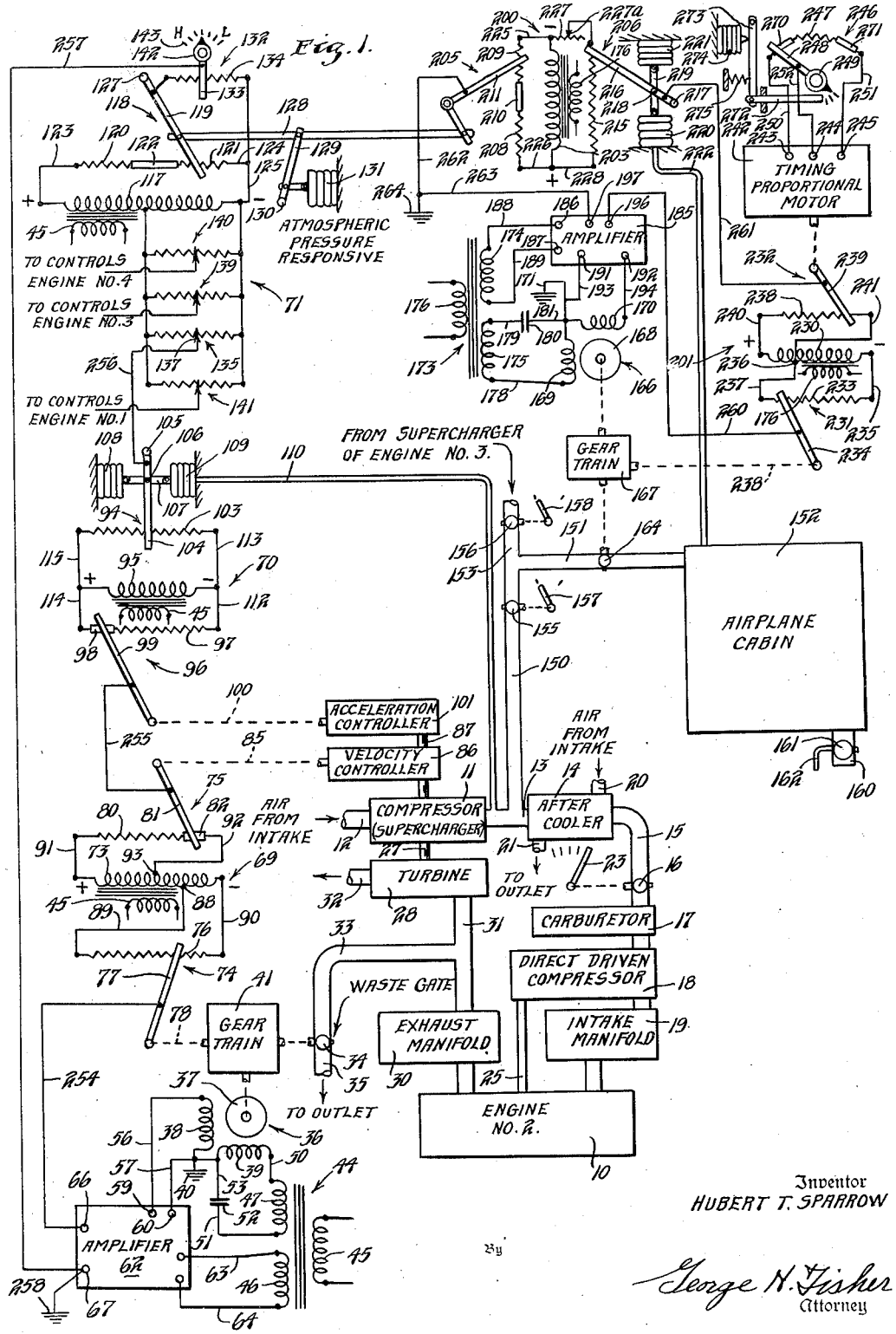
Inventor
HUBERT T. SPARROW
By
George N. Fisher
Attorney

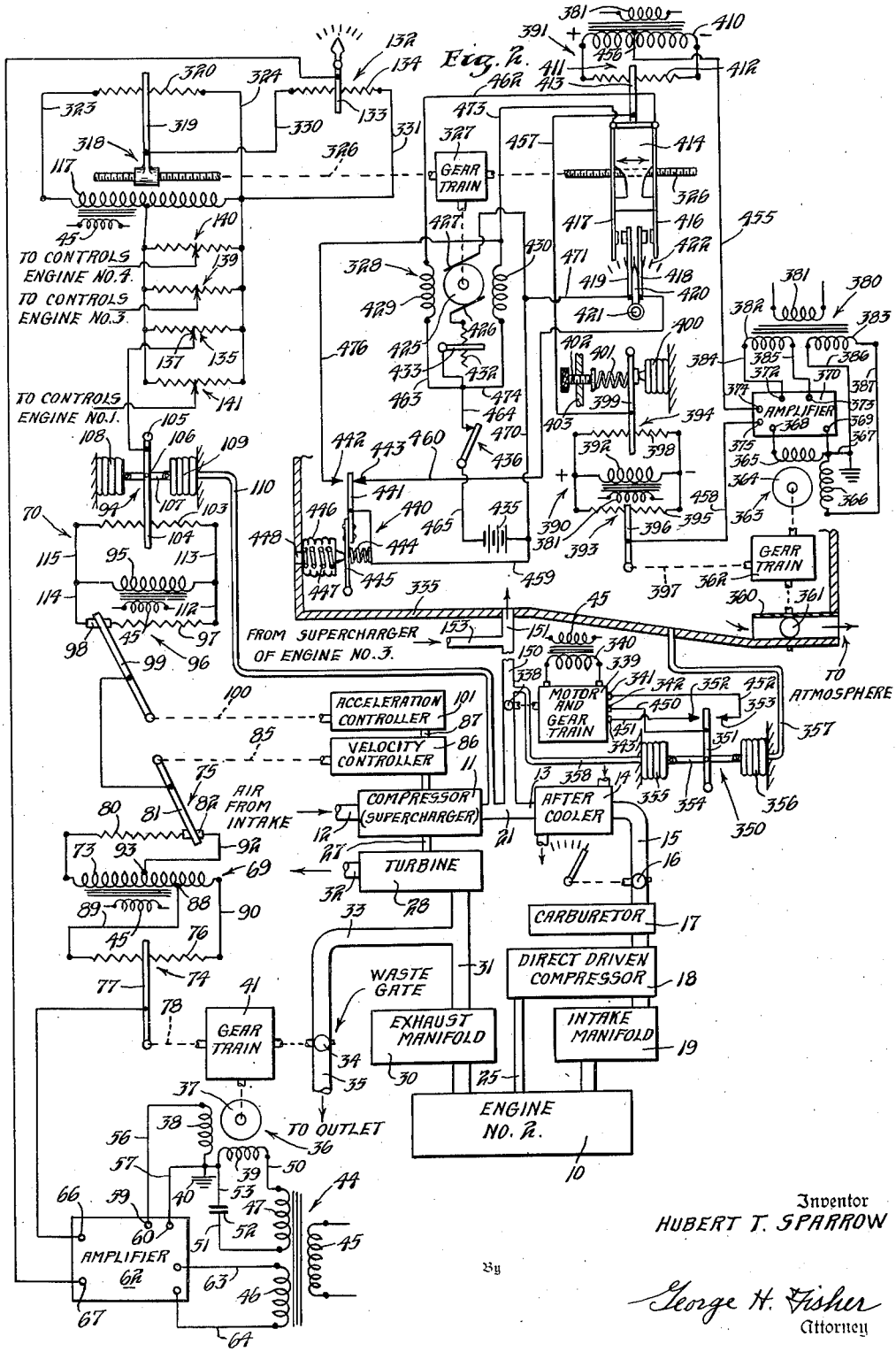

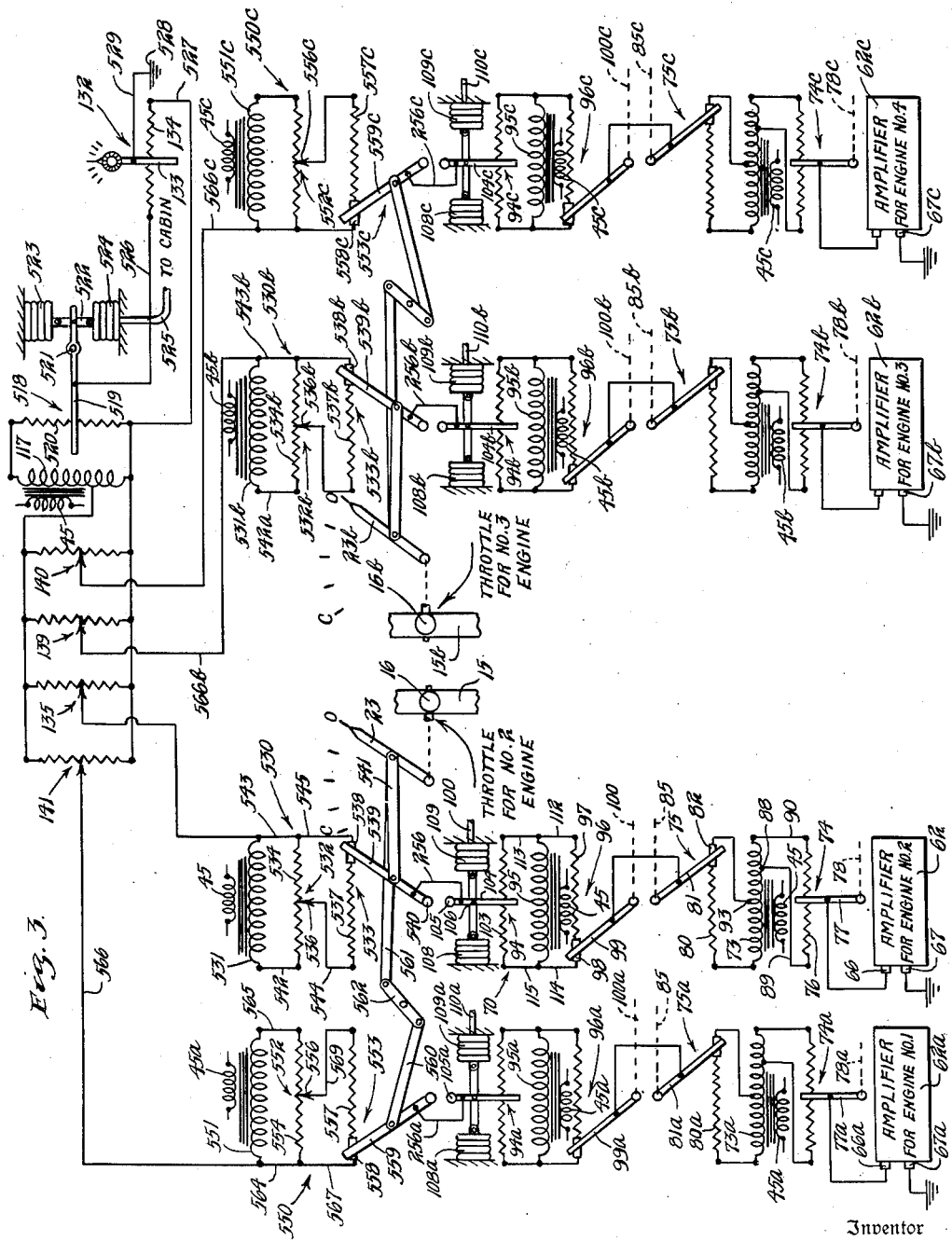

Patented Mar. 29, 1949

2,465,759

UNITED STATES PATENT OFFICE 2,465,759

AIRCRAFT PRESSURE CONTROL SYSTEM

Hubert T. Sparrow, Minneapolis, Minn., assignor to Minneapolis-Honeywell Regulator Company, Minneapolis, Minn., a corporation of Delaware Application June 22, 1944, Serial No. 541,520

28 Claims. (Cl. 244—59)

The present invention is concerned with aircraft pressure control systems and more particularly with a system for controlling means for supplying air under pressure to both the engine and the cabin of an aircraft propelled by internal combustion engines and having a cabin adapted to be maintained normally at a higher pressure than the surrounding atmosphere.

It is common practice in connection with internal combustion engine propelled aircraft operating at higher altitudes to employ some form of compressor, commonly known as a supercharger, for increasing the pressure of the air forming a part of the fuel mixture of the supply to the internal combustion engine. One common form of said supercharger has been the turbine supercharger in which the turbine is operated by exhaust gases from the engine. In planes operating at relatively high altitudes, it is desirable not only to increase the pressure of the air supplied to the engine but also to increase the pressure within the cabin. It has previously been proposed to do this by providing a separate compressor usually driven directly from the aircraft engine. The present invention contemplates the use of the same supercharger for both supercharging the air supplied to the internal combustion engine and also maintaining the proper pressure within the cabin.

It is broadly an object of the present invention to provide in connection with an aircraft propelled by an internal combustion engine and having a cabin normally maintained at a higher pressure than the surrounding atmosphere, a motor operated compressor for supplying air to both the engine and the cabin with means for controlling the motor operating the compressor in accordance with conditions affecting both engine operation and the need for air in the cabin.

A further object of the present invention is to provide such a system in which the pressure of the air is normally regulated so as to assume a value selected for optimum engine operation with means to insure that the pressure selected will never be too low to insure the maintenance of a proper pressure within the cabin.

A further object of the present invention is to provide an arrangement in which the means for limiting the extent of adjustment of the pressure is responsive to cabin pressure.

An alternative object of the invention is to provide such an arrangement in which the limiting means is responsive to atmospheric pressure.

Still a further object of the present invention is to provide a novel means for limiting the effect of the pressure adjusting means in accordance with cabin pressure.

A still further object of the present invention is to provide a system of the type considered above in which the compressor is operated by a motor driven by the exhaust gases from the engine and in which the means for controlling the motor is compensated whenever the throttle is moved so as to compensate for a change in volume of the exhaust gas.

A still further object of this invention is to provide in connection with an aircraft having a plurality of engines and compressors therefor, the compressors of certain engines being employed to increase the pressure of the cabin and others not being so employed, compensating means operated by the throttle of the engines whose compressors are to introduce the necessary compensation into the control systems for all of the compressors to maintain the power output of the engines at substantially the same value.

A further object of the present invention is to provide a novel means of controlling the flow of air between the compressor and the cabin in connection with a system of the type discussed above.

A still further object of the present invention is to provide a novel means for controlling cabin pressure in which the cabin pressure can be changed only at a timed rate.

A still further object of the invention is to provide a novel form of electrical control system for controlling the pressure within the cabin.

Other objects will be apparent from a consideration of the accompanying specification, claims, and drawings of which Figure 1 is a schematic representation of an aircraft pressure control system controlled in accordance with the present invention, Figure 2 is a schematic representation of a modified form of my system, and Figure 3 is a schematic representation of the electrical control portion of a still further modification of my system.

Referring to the drawings, the system is illustrated in connection with a four engine aircraft in which the air supplied to the carburetor is compressed by a turbine operated supercharger, the turbine being driven by exhaust gases. In order to facilitate a clearer understanding of the invention, the various elements have been shown schematically. In Figure 1, the controls for only engine number two are illustrated, this engine being one of the inboard engines. In the proposed embodiment of my invention, the compressors of engines number two and number three, the two inboard engines, are employed to supply air under pressure to the cabin. The compressors of the outboard engines, engines number one and four, are not connected with the cabin and are employed merely in the usual manner to supply supercharged air to the carburetors of their respective engines.

Referring now to Figure 1, engine number two is schematically indicated by the reference character 10. Air for supporting combustion in the engine is supplied by compressor 11 receiving air from the atmosphere through a pipe 12 connected with any suitable air intake and delivering the air under compression through a duct 13, an after cooler 14, a duct 15 in which is located a throttle 16, a carburetor 17, a direct driven compressor 18, and an intake manifold 19 to the engine 10.

The after cooler 14 removes the heat of compression from the air discharged by compressor 11, when this is required, and for this purpose receives fresh air through the intake pipe 20, this air being passed in heat exchanging relation to the air in the induction system and delivered as waste through an outlet pipe 21.

The throttle 16 is of conventional construction and is operatively connected to an operating handle 23.

The carburetor 17 functions in the usual manner to mix fuel delivered from a source (not shown) with the air which is supplied by compressor 11 to form a fuel mixture of the proper proportion. The pressure of this mixture is increased by the direct driven compressor 18 which is driven through a shaft 25 directly by the engine 10. Direct driven compressor 18 is usually built into the intake manifold 19 but is shown separately for convenience of illustration.

The compressor 11 is driven through a shaft 27 by a turbine 28, the compressor and turbine together being commonly referred to as a turbo supercharger. The turbine 28 is powered by exhaust gases from the engine, receiving the exhaust gases through an exhaust manifold 30 and a duct 31 and discharging the gases through an outlet pipe 32. A by-pass duct 33 is shown as leading off from the duct 31 and a damper or waste gate 34 is provided in this duct 33 to control the flow of exhaust gases through an outlet duct 35.

The resistance to flow of the exhaust gases through the duct 33 will, of course, be less than the resistance through the turbine 28 and hence as the waste gate 34 is opened, the gases will to an increasing extent discharge through conduit 33 rather than through the turbine 28. As the waste gate is progressively closed, on the other hand, more and more of the total volume of exhaust gases will be diverted through the turbine to increase its speed and that of the compressor 11 so as to increase the compression ratio of the latter. The position of the waste gate 34 is thus seen to control the speed of the turbo supercharger and the pressure of the air supplied thereby to the engine.

The waste gate 34 is positioned by a reversible two-phase alternating current motor 36 having an armature 37 and two field windings 38 and 39 spaced 90 electrical degrees apart. The adjacent terminals of the two windings 38 and 39 are connected together and to ground as indicated at 40. The motor is shown connected through a gear train 41 to the waste gate 34.

A transformer 44 is employed for energizing the motor and the various control equipment for the motor. The transformer 44 comprises a primary winding 45 and a plurality of secondary windings including windings 46 and 47. It is to be understood that the transformer 44 includes other secondary windings which for convenience of illustration have been shown in connection with the various electrical elements with which they are immediately associated and will be referred to at the time that these elements are described.

The winding 47 of transformer 44 is employed to continuously energize the field winding 39, the secondary 47 being connected to the field winding 39 by a conductor 50 and by a conductor 51, a condenser 52, and a conductor 53. The condenser 52 is of such value that at the frequency of the source to which primary winding 45 is connected, the condenser 52 and the winding 39 are resonant. As a result, the inductive effect of winding 39 is overcome so that the current through winding 39 is in phase with the voltage across secondary 47 instead of lagging the same by ninety electrical degrees as would otherwise be the case.

The other field winding 38 is connected by conductors 56 and 57 to the output terminals 59 and 60 of an amplifier 62. The amplifier 62 is supplied with energy from secondary winding 46 to which it is connected by conductors 63 and 64.

The amplifier is of any suitable type in which the output of the amplifier has a definite phase relationship to the input voltage. A typical amplifier of this type is the one shown in the copending application of Albert P. Upton, Serial No. 437,561, filed April 3, 1942, now Patent No. 2,423,534, issued July 8, 1947. The amplifier is provided with input terminals 66 and 67. When an input voltage of one phase relationship is supplied to input terminals 66 and 67, the current supplied to winding 38 leads by ninety electrical degrees, the current flowing through winding 39. Under these conditions, the motor 36 rotates in one direction. When the signal voltage applied to terminals 66 and 67 is one-hundred-eighty degrees out of phase with that previously considered, the current supplied by amplifier 62 to winding 38 will lag by ninety degrees that flowing through winding 39. Under these conditions, the motor 36 will rotate in the opposite direction. Thus, the motor 36 will rotate in one direction or the other, depending upon the phase of the signal voltage applied to terminals 66 and 67.

The signal voltage applied to terminals 66 and 67 is the output voltage of a resistance network including a plurality of series connected individual networks 69, 70, and 71.

The network 69 comprises a secondary winding 73 which may constitute a secondary winding of the transformer 44 or any other transformer energized from the same source of energy as primary winding 45. In order to identify the winding 73 as a transformer secondary winding, the primary winding 45 is again shown in association with winding 73. Also constituting part of the network 69 are two potentiometers 74 and 75. The potentiometer 74 comprises a resistance element 76 and a contact arm 77 movable thereover. The contact arm 77 is operatively connected by a shaft 78 to the gear train 41 so that upon the motor 36 being operated to position the waste gate 34, the contact arm 77 is similarly positioned. The potentiometer 74 functions as a rebalancing potentiometer as will be more fully explained hereinafter. The potentiometer 75 consists of a resistance element 80 and a slidable contact arm 81. The resistance 80 is provided at one end with a conductive bar 82. It is to be understood that movements of the contact arm 81 over this conductive bar do not affect the output voltage of the bridge 69 so that minor variations in the position of the slider 81 will not have any disturbing effect. Contact arm 81 is connected by a shaft 85 to a velocity controller 86. This velocity controller is driven through a shaft 87 by the turbine 28 so that the velocity controller is driven at the same speed as the turbine. The velocity controller may be of any conventional construction and functions to move the contact arm 81 whenever the speed of the turbine rises above a desired value. A typical type of velocity controller suitable for the purposes of the present invention is shown in my co-pending application, Serial No. 476,797, filed February 22, 1943.

The left-hand terminal of the resistor 76 is connected to intermediate tap 88 of secondary 73. The right-hand terminal of resistor 76 is connected by a conductor 90 to the right-hand terminal of secondary 73. The left-hand terminal of resistor 80 is connected by a conductor 91 to the left-hand terminal of secondary 73. The conductive bar 82 constituting the right-hand terminal of resistor 80 is connected by a conductor 92 to a tap 93 of secondary 73. In one particular embodiment of my invention, a secondary winding of 42 volts was employed for winding 73. In this particular embodiment, the voltage between the left-hand terminal and tap 93 was 24 volts, that between taps 93 and 88, 6 volts, and that between tap 88 and the right-hand terminal, 12 volts.

Network 70 is in the form of a bridge comprising a secondary winding 95 preferably of the transformer 44, and two potentiometers 96 and 94. The potentiometer 96 consists of a resistance member 97 terminating at its left-hand end in a conductive bar 98 and a contact arm 99 which slides over the resistance 97 and a contact bar 98. Contact arm 99 is positioned through a shaft 100 by an acceleration controller 101. The acceleration controller 101 may be any suitable device which will impart a movement to shaft 100 causing clockwise movement of contact arm 99 whenever its driven member is accelerated beyond a predetermined amount. The acceleration controller is connected by shaft 87 to the turbine 28 so as to be responsive to the acceleration of the turbine. An acceleration controller suitable for the purposes of the present invention is shown in my aforementioned co-pending application.

The potentiometer 94 consists of a resistance member 103 and a slider arm 104. The slider arm 104 is pivotally connected at 105 to a suitable support. Slider arm 104 is also connected at 106 to a link 107 which in turn is connected to two opposed bellows members 108 and 109. The bellows member 108 is an evacuated bellows. The bellows member 109 is connected through a tube 110 with the duct 21 leading from the outlet of the compressor. The bellows 109 is thus subject to the discharge pressure of the compressor, or in other words, the induction system pressure. The bellows 108 is provided for compensating for changes in atmospheric pressure. Since bellows 108 and 109 are subjected to the same atmospheric pressure, it is obvious that any changes in atmospheric pressure will cancel out. Thus, the position assumed by arm 104 is always a function of the induction system pressure.

The network 70 is in the form of a simple Wheatstone bridge, the right-hand terminals of resistors 97 and 103 being connected to the right-hand terminal of secondary 95 by conductors 112 and 113. Similarly, the left-hand terminals of resistors 97 and 103 are connected by conductors 114 and 115 to the left-hand terminal of secondary 95. As with the case of the secondary winding 73, the secondary winding 95 constitutes an additional winding of transformer 44.

The network 71 includes a secondary winding 117, which again may be a secondary winding of the transformer 44 or of a separate transformer energized from the same source of power as primary winding 45. Connected to the secondary 117 is a potentiometer 118. This potentiometer consists of a slider 119 which cooperates with a pair of resistors 120 and 121 connected by a conductive bar 122. The resistors 120 and 121 and the conductive bar 122 are connected in series to the secondary 117 by conductors 123, 124 and 125. Slidable contact arm 119 is pivoted at 127 and is connected to an actuating rod 128 which in turn is pivotally connected to a link 129. Link 129 is pivotally mounted at 130 and is operatively connected to a bellows 131. The bellows 131 is evacuated so as to be unaffected by temperature and is located so as to be influenced by atmospheric pressure. Thus, the position assumed by rod 128 and hence slider 119 is at all times dependent upon atmospheric pressure. The connecting means between bellows 131 and contact arm 119 including the lever 129 and rod 128 are so disposed that a drop in atmospheric pressure causes movement of the slider 119 to the left.

Connected between the slidable contact arm 119 and the right-hand terminal of resistor 121 is a potentiometer 132 comprising a manually positionable slidable contact arm 133 which is in contact with a resistor 134. Potentiometer 132 is employed as a pressure selecting potentiometer and is set to maintain the desired compressor discharge pressure. A knob 142 is secured to arm 133 to position the same. The knob 142 carries a pointer cooperating with suitable indicia 143 to indicate the manifold pressure selected, the manifold pressure being related to the induction system pressure.

The resistance network 71 not only comprises the secondary 117 and the potentiometer 118 but also includes a further potentiometer 135. This potentiometer 135 comprises a resistor 136 and a slider 137. The potentiometer 135 is one of four potentiometers. These potentiometers have been given the numbers 135, 139, 140, and 141. Each of these potentiometers is designed to be associated with the controls for a different engine. The secondary 117 and potentiometers 118 and 132 are common to four networks, each of which includes a different one of these potentiometers and each of which is associated with a composite network constituting a part of the control mechanism for one of the engines. The network 71, which is the one being considered and which forms part of the control arrangement for engine No. 2, is unaffected by the positions of the sliders of the other potentiometers 139, 140 and 141.

The mechanism which has been described so far is that which is concerned with the control of the waste gate 34 and hence of the turbine 28. As previously indicated, the present invention is concerned not only with the control of the turbine but also with the control of the airplane cabin pressure. As will be more apparent from the subsequent description, the system which has been described so far has been modified to insure that, regardless of engine requirements, there will be a sufficient flow of air to the cabin to enable the cabin pressure control apparatus to function properly. The cabin pressure control apparatus will now be described.

Leading from the discharge duct 13 of the compressor 11 is a conduit 150. This conduit in turn connects with a main conduit 151 extending to an airplane cabin which has been schematically represented by the reference numeral 152. Connected with the main conduit 151 is a conduit 153 which leads from the discharge of the supercharger of engine No. 3. While conduits 150, 151 and 153 have been shown for convenience of illustration as of substantially the same size as the conduits 13 and 15, it is to be understood that this is only for convenience in illustration and that actually these conduits would be of considerably smaller size. Disposed in conduits 150 and 153 are valves 155 and 156. These valves are provided with manual operators 157 and 158, respectively. Suitable indicia may be disposed adjacent the operators 157 and 158 to indicate the open and closed positions of the valves. Normally, these valves are both open but may be closed when it becomes necessary to dispense with the operation of one of the engines.

Connected with the airplane cabin is a discharge conduit 160. This conduit is provided with an adjustable valve 161 provided with an operating handle 162. This valve is normally maintained in any desired adjusted position.

Disposed in the supply conduit 151 is a valve 164 of any suitable type. The valve 164 is adapted to be driven by a motor 166 through a gear train schematically indicated at 167. The motor 166 is of the two-phase type having a rotor 168 and two windings 169 and 170 which are connected together and to ground at 171. The relative direction of rotation of motor 166 and hence of the movement of valve 164 depends upon the phase relation between the currents flowing through windings 169 and 170.

A transformer 173 is employed for energizing the motor 166 and the control apparatus therefor. The transformer 173 consists of a pair of secondary windings 174 and 175 and a primary winding 176 connected to any suitable source of power such as the source to which primary winding 45 of transformer 44 is connected.

The secondary winding 175 is provided for the purpose of energizing winding 169. One terminal of this secondary winding is connected to one terminal of motor field winding 169 by the conductor 178. The other terminal of secondary winding 175 is connected to motor field winding 169 by conductor 179, condenser 180, and conductor 181. The condenser 180 is of such value that at the frequency of the supply current, the winding 169 and condenser 180 are resonant. Consequently, the current through winding 169 is displaced in phase approximately 90° from the phase position it would assume if condenser 180 were not present.

The other secondary winding 174 of transformer 173 is employed to energize an amplifier 185, being connected to the input terminals 186 and 187 thereof by conductors 188 and 189. The amplifier 185 may be of any suitable type for amplifying an alternating voltage signal and producing an output having a definite phase relation to the phase position of the input. For example, the amplifier 185 may be of the same type as amplifier 62. The amplifiers are provided with output terminals 191 and 192 which are connected by conductors 193 and 194 to motor field 170. Thus, the phase relationship of the current through winding 170 with respect to that through winding 169 will be dependent upon the phase position of the output voltage of amplifier 185. This in turn is dependent upon the phase position of the voltage applied to the input terminals 196 and 197 of the amplifier.

The voltage applied to the input terminals 196 and 197 is derived from a composite resistance network consisting of two individual networks generally indicated by the reference numerals 200 and 201. The resistance network 200 consists of a transformer secondary winding 203 and two potentiometers 205 and 206. The potentiometer 205 consists of two resistances 208 and 209 which are connected together by a conductive bar 210. Movable over the resistances 208 and 209 and the conductive bar 210 is a slidable contact bar 211. The bar 211 is in the form of a bell-crank lever, the arm of which is connected to the actuating member 128. As previously explained, this actuating member 128 is in turn operatively connected to bellows 131 responsive to atmospheric pressure. Thus, the position of not only slider 119 but also of slider 211 is determined by atmospheric pressure. The connection between bellows 131 and the sliders 119 and 211 is such that when the bellows 131 is subjected to sea level pressure, slider 119 will be at the right-hand end of its stroke and slider 211 will be at the uppermost end of its stroke. As the atmospheric pressure decreases, the sliders 211 and 119 will move in a clockwise direction. At a pressure corresponding to an elevation of eight thousand feet, slider 119 will leave resistance 121 and will engage conductive bar 122. At the same elevation, slider 211 will engage conductive bar 210. At an elevation of thirty thousand feet, the slider 119 will move off of conductive bar 122 onto resistance 120 and the slider 211 will move off of conductive bar 210 onto resistance 208.

The potentiometer 206 consists of a resistance 215 and a contact arm 216 movable in slidable engagement therewith. The contact arm 216 is pivoted at 217 and is pivotally connected at 218 to a link 219 positioned by two opposing bellows 220 and 221. Bellows 221 is an evacuated bellows which is affected only by atmospheric pressure. Bellows 220 is connected by a tube 222 to the airplane cabin 152 so that the interior of bellows 220 is subjected to cabin pressure. Due to the fact that both bellows 220 and 221 are equally affected by atmospheric pressure and since these two bellows are connected in opposition, the effect of atmospheric pressure on them is cancelled out. Thus the position of link 219 is determined solely by cabin pressure. As cabin pressure drops, the link 219 is moved downwardly to move slider 216 downwardly.

The resistance 215 and the resistance assembly consisting of resistances 208 and 209 and conductive bar 210 are connected to secondary winding 203 to form a Wheatstone bridge. The opposite ends of resistors 208 and 209 are connected to winding 203 by conductors 225 and 226. The upper end of resistor 215 is connected to secondary winding 203 by resistor 227 and slidable contact 227a. The lower end of resistor 215 is connected to secondary winding 203 by conductor 228. Thus, the junction of conductor 225 and resistor 227 on the one hand and the junction of conductors 226 and 228 on the other hand constitute the input terminals of the bridge. The sliders 211 and 216 constitute the output terminals.

The resistance network 201 includes a secondary winding 230 and a pair of potentiometers 231 and 232. The secondary winding 230 may constitute an additional winding of the transformer 173, or it may form part of the winding of a separate transformer supplied from the same source of power as transformer 173. The potentiometer 231 consists of a resistance member 233 and a contact arm 234 in slidable engagement therewith. The right-hand terminal of resistor 233 is connected by conductor 235 to the right-hand terminal of secondary 230. The left-hand end of resistor 233 is connected by conductor 237 to an intermediate tap 236 of secondary 230. The slider 234 is connected through a shaft 238 to the gear train 167 and is hence driven by motor 166. Potentiometer 231 functions as a follow-up potentiometer, as will be explained in more detail later.

The potentiometer 232 consists of a resistor 238 and a contact arm 239 movable thereover. The opposite ends of resistor 238 are connected by conductors 240 and 241 to the left-hand terminal and the tap 236, respectively, of secondary 230.

The slider 239 of potentiometer 232 is positioned by a proportional motor 242. Such a motor may be of any suitable type which positions a controlled object in accordance with the setting of a control potentiometer. For example, this motor may be of the type shown in the patent to Edmondson No. 2,127,680.

The motor 242 is provided with three input terminals 243, 244, and 245. Connected to these input terminals is a potentiometer 246 consisting of a rotatable contact arm 248 slidably engaged with resistor 247 and contact bars 270 and 271, resistance 247 being connected in series between bars 270 and 271. The contact arm 248 is manually operable and is provided with a knob 249 for positioning the same. The opposite ends of bars 270 and 271 are connected by conductors 250 and 251 to terminals 243 and 245. Contact arm 248 is connected by conductor 252 to terminal 244. The position which contact arm 239 will assume is dependent upon the relative voltages between terminals 243 and 244 on the one hand and conductors 244 and 245 on the other hand. This is in turn dependent upon the position of slider 248 with respect to resistor 247 and bars 270 and 271. As shown, contact arm 248 is in its extreme left-hand position so that slider 239 is likewise in its extreme right-hand position.

The movement of arm 249 with respect to contact bars 270 and 271 and resistor 247 is limited by means of a slidable stop 272 which is suitably mounted for horizontal movement. Pivotally connected to the stop bar 242 is a link 273 which is pivotally mounted at its upper end and is designed to cooperate with an evacuated bellows 274 responsive to atmospheric pressure. A spring 275 biases link 273 into engagement with the atmospheric pressure responsive bellows 274. Upon reduction in atmospheric pressure due to the plane rising to a higher altitude, the lever 273 is rocked in a clockwise direction moving the stop bar 272 to the left. The apparatus is so designed that up to an altitude of 8,000 feet, the stop bar 272 prevents the slider 249 from being moved in a clockwise direction beyond the end of the conductive bar 270. Between elevations of 8,000 to 30,000 feet, the stop bar 242 assumes positions in which the bar 249 can be moved a distance along the resistor 247 corresponding to the elevation of the plane above 8,000 feet. After the plane reaches an elevation of 30,000 feet, the slider 249 can thus be moved over the full range of resistor 247. This, however, is the maximum amount of change that can be introduced. The slider 249 thereafter moves along the contact bar 271.

*Operation of Figure 1*

The various elements are shown in the position which they assume when the plane is at an altitude of approximately four thousand feet. Under these conditions, it is desired to maintain a cabin pressure equivalent to outside pressure, in other words, a pressure corresponding to an altitude of four thousand feet.

The air supplied to the cabin 152 under these conditions is merely what is necessary for ventilation purposes. Consequently, air should be supplied at no greater rate than it escapes through the outlet conduit 161. Under these circumstances, the valve 164 is in a partly closed position, this position being determined by the relative positions of the contact arms of the resistance networks 200 and 201 as will be presently explained.

The various controls are shown in the position assumed when the turbine is being operated at only a portion of its capacity. In this position of the controls, the waste gate 34 is partly open as indicated by the intermediate position of contact arm 77. It is to be understood that the range of movement of contact arm 77 of rebalancing potentiometer 74 is substantially the same as the movement of waste gate 34, contact arm 77 being in its extreme right-hand position when the waste gate is fully open, and in its extreme left-hand position when the waste gate is fully closed.

In order to understand the effect of the variation in the various conditions controlling the present apparatus, the effect of the resistance networks on the respective amplifiers will now be described. Referring first to the composite network including the individual networks 69, 70 and 71, it will be recalled that these networks control the input voltage to input terminals 66 and 67 of amplifier 62. Each network has a definite output voltage depending upon the relative positions of its sliders. These networks are connected together in series by the following circuit: from input terminal 66 through conductor 254, contact arms 77 and 81 of network 69, conductor 255, contact arms 99 and 104 of network 70, conductor 256, slider 137 and contact arm 133 of network 71, and conductor 257 to input terminal 67 which is connected to ground as indicated at 253. The total voltage impressed between amplifier input terminals 66 and 67 is thus equal to the algebraic sum of the outputs of networks 69, 70 and 71.

For convenience in understanding the invention, the operation is treated during the single half-cycle of operation in which the left-hand terminals of the secondary windings 73, 95 and 117 are positive while the left-hand terminals are negative, as indicated by the positive and negative symbols appearing on the drawings.

Referring first to the network 69, it will be noted that the slider 77 assumes a potential with respect to the negative terminal which is intermediate the potential of tap 88 and zero potential. Thus, assuming the total voltage across secondary 73 to be 42 volts, that between tap 88 on the left-hand end to be 12 volts and that between tap 93 and 88 to be 6 volts, the slider 77 assumes a potential with respect to the right-hand end which is a portion of 12 volts determined by slider 77.

Thus, as slider 77 is in a position one-fourth of the way from the right-hand end, the potential difference between slider 77 and the right-hand end is 3 volts. The potential of slider 81 with respect to the right-hand terminal of secondary 73 is equal to the voltage existing between tap 93 and the left-hand terminal of secondary 73 plus a portion of the voltage between the left-hand end of secondary 73 and tap 93, the amount of this portion being determined by the position of slider 81 with respect to resistance 80. As shown, slider 81 is in its extreme right-hand position in which it is at the same potential as tap 93. As slider 81 is moved to the left, the voltage between slider 81 and tap 93 is increased. The voltage between sliders 81 and 77 will at all times be dependent upon the voltage between slider 81 and the right-hand terminal minus the voltage between slider 77 and the right-hand terminal. With slider 81 in the extreme right-hand position as shown, the voltage between sliders 81 and 77 will be dependent solely on the potential between taps 93 and the right-hand terminal minus the voltage between slider 77 and the right-hand terminal. Assuming the values given above and assuming slider 77 to be in the three-quarters open position, slider 81 will be 15 volts positive with respect to slider 77.

The operation of resistance network 70 will be relatively obvious since, as pointed out above, this network is a simple Wheatstone bridge. If sliders 99 and 104 were each in their mid positions, the voltage between them would be equal to zero, this being equivalent to a balanced condition of the bridge. Upon slider 101 assuming a position to the right of slider 99, as shown, the voltage between sliders 104 and 99 is a negative voltage. If slider 104 is in its mid position and the total voltage of a secondary 95 is 24 volts, then slider 104 is exactly 12 volts negative with respect to slider 99. As a result, in the series circuit including the networks 69 and 70 there is one 12 volt voltage and another 15 volt voltage, the two voltages being of opposite polarity. The 12 volt voltage is of such polarity as to tend to make the conductor 256 negative with respect to conductor 254. The 15 volt voltage is one which would tend to make conductor 256 positive with respect to conductor 254. As a result of these two voltages, the net voltage between conductors 256 and 254 is a 3 volt positive potential difference.

The output of the network 71 is dependent upon three factors, the relative positions of the contact arm 133, the contact arm 119 and the slider 137. The potentiometer 135 is connected across a portion of the transformer winding 117. This portion may be half the winding. If the total voltage of winding 117 is 24 volts, for example, then the total voltage across resistor 135 is 12 volts. Assuming that the slider 137 is in its mid position, the potential between slider 137 and the right-hand terminal of secondary 117 is 6 volts. The resistors 120, 122, and 121 are connected across the entire secondary winding 117. The voltage between slider 119 and the right-hand terminal of secondary 117 is thus a portion of the total voltage across secondary 117, the extent of the portion being dependent upon the slider position. Under the conditions being assumed, the slider 119 is at a position corresponding to four thousand feet. If, for purposes of simplicity, the resistance 121 is assumed to be equal to the resistance 120 and the slider 119 is at approximately mid position of slider 121, then the voltage existing between slider 119 and the right-hand end of secondary 117 will be 6 volts. The polarity of this voltage, moreover, will be such that the slider 119 is positive with respect to the right-hand end. The voltage between slider 119 and the right-hand terminal of secondary 117 is impressed across the potentiometer 132, so that the output of the bridge including potentiometers 118 and 135 is determined not only by the position of the sliders 119 and 137 but also by the position of slider 133. The potentiometer 132 is employed to select the manifold pressure which is maintained. With the elements in the position shown, the slider 133 is in its mid position. Thus, the voltage between the slider 133 and the right-hand terminal of secondary 117 will be half of the voltage impressed between slider 119 and the right-hand terminal of secondary 117. Using the specific values given above, the voltage existing between slider 132 and the right-hand terminal will be 3 volts positive. Since there is a potential difference of 6 volts between the slider 137 and the right-hand terminal of secondary 117, slider 133 will be at a potential 3 volts lower than the potential of slider 137. Thus, the voltage output of bridge 71 as measured by the slider 132 and slider 137 is a negative 3 volts. As previously explained, the voltage output of bridge 69 as measured between sliders 81 and 77 is a positive 15 volts, and that across bridge 70 as measured between the sliders 104 and 99 is a negative 12 volts. Hence, the effective voltage across all three networks 69, 70 and 71 is zero so that no voltage is impressed between the amplifier terminals 66 and 67.

Under the conditions just described, the pressure which is being maintained at the discharge of the compressor, in other words the induction system pressure, is at the value which has been selected by the manifold pressure selector potentiometer 132. Let it be assumed now that the induction system pressure decreases. The effect of this is that the slider 104 is moved to the right. Such a movement to the right causes slider 104 to be more negative with respect to the slider 99 so that during the half-cycle being considered the potential of terminal 67 is lower with respect to that of terminal 66, or in other words a positive voltage is applied to terminal 66. Since an alternating current is employed, this simply means that a voltage of one-phase relationship is applied to terminals 66 and 67. This signal is amplified by amplifier 62 which supplies the winding 38 with a current displaced in phase 90° from that flowing through winding 39. The direction of the rotation of motor 30 is such as to cause waste gate 35 to be moved towards closed position and to cause contact arm 77 to be moved to the right.

The movement of waste gate 34 towards closed position tends to increase the flow of exhaust gas through the turbine 28 and hence to increase the speed of operation of compressor 11. The movement of contact arm 77 to the right tends to increase the positive voltage difference between sliders 81 and 77. This tends in turn to eliminate the unbalance voltage of the entire composite network caused by the movement of slider 104 to the right. The movement of waste gate 34 and slider 77 will continue until the resistance network is balanced, at which time no signal voltage is applied to amplifier 62 with the result that the winding 38 is no longer energized from amplifier 62.

If at any time there is an increase in the induction system pressure, contact arm 104 will move to the left to raise the potential of arm 104 with respect to slider 99. This will result, during the half-cycle being considered, in the potential of terminal 67 being raised with respect to that of terminal 66. In other words, a voltage of opposite polarity is applied to the input terminals of amplifier 62. In terms of alternating current, this is an alternating voltage of opposite phase to the alternating voltage previously considered. The effect of this is that amplifier 62 supplies a current to winding 38 which is displaced in phase by 180 electrical degrees from that previously considered. The result is that while the currents through windings 38 and 39 are again displaced 90° in phase respect to each other, the relative phase relationship is reversed. As a result, motor 36 will rotate in the opposite direction to move waste gate 34 to closed position and to move slider 77 to the left. The effect of the movement of waste gate 34 towards open position is to permit a greater amount of exhaust gases to flow through conduit 33 so as to decrease the amount flowing through the turbine 28. This will in turn reduce the speed of the turbine and hence the induction system pressure. The movement of slider 77 to the left will tend to rebalance the network so as to overcome the signal introduced by the movement of slider 104 to the left.

If at any time, the velocity becomes excessive, the slider 81 is moved to the left. This raises the potential of slider 81 with respect to slider 77 so as to have the same effect upon the unbalance voltage of the entire composite resistance network as occurred when slider 104 moved to the left. In other words, winding 38 is supplied with a current of such phase relationship with respect to that supplied to winding 39 that the motor 41 is rotated in a direction opening the waste gate 34 and moving slider 77 to the left. The opening of waste gate 34 will reduce the speed of the turbine by permitting more of the exhaust gas to flow through conduit 33.

If the acceleration becomes excessive at any time, the acceleration controller 101 will move slider 99 to the right. The effect of this will again be to raise the potential of terminal 67 with respect to terminal 66 during the half-cycle being considered for illustrative purposes. In other words, the effect will be the same as that produced by an increase in induction system pressure. The result is that the waste gate is again moved towards open position to decrease the amount of exhaust gas flowing through the turbine and hence to decrease the acceleration thereof.

The potentiometer 132 is employed to manually select any desired induction system pressure. Upon movement of the knob 142 in a clockwise direction, the induction system pressure that is maintained is decreased. Upon movement of the knob 140 in a counter-clockwise direction, it is increased. The movement of knob 142 in a clockwise direction, for example, causes slider 133 to be moved to the left along resistance 134. This tends to raise the potential of slider 133 with respect to slider 137 and hence to raise the potential of terminal 67 with respect to terminal 66. It will be recalled that this is the same effect which in every case led to a reduction in the induction system pressure. While the reduction in the induction system pressure tends to move slider 104 to the right to increase this pressure, the net effect after the system is stabilized is that the induction system pressure is at a lower value than previously existed. It will be obvious that if slider 133 is moved to the right, the current flowing through winding 38 is of the opposite phase so as to tend to increase the induction system pressure.

The purpose of the potentiometer 118 which forms an important part of the present invention, is to limit the effect of the selector potentiometer 132. It is to be noted that when the slider 133 is moved to its extreme left-hand end of its range of movement, corresponding to the minimum induction system pressure, slider 133 is at a potential corresponding to slider 119. The position of slider 119 is in turn determined by atmospheric pressure. Thus, the minimum pressure position which slider 133 can assume only results in an effective position corresponding to the atmospheric pressure. As previously indicated, it is desired to always maintain the cabin pressure at least as high as the atmospheric pressure as the plane climbs up to eight-thousand feet. From eight-thousand feet to thirty-thousand feet, it is desired that the cabin pressure be the same as the atmospheric pressure at eight-thousand feet. From thirty-thousand to forty-thousand feet, it is desired that the differential between cabin pressure and outside pressure be substantially the same as that existing at thirty-thousand feet, this pressure differential being substantially the maximum pressure differential the cabin walls can safely withstand over prolonged periods of time. As the plane ascends, the slider 119 is moved to the left by the atmospheric pressure responsive device 131. The effect of this is to increase the voltage across the resistance 134 and hence to increase the possible effect of slider 132. For example, when the slider is at the position corresponding to eight-thousand feet, it is possible for the voltage between slider 133 and the right-hand terminal to be as high as 12 volts instead of the 6 volts previously considered. In other words, as the aircraft ascends from sea level to eight thousand feet, it is possible for lower and lower pressures to be selected by the manifold pressure selector potentiometer 132. At any time, however, the pressure selected by potentiometer 132 can never be lower than a value which is greater by a predetermined amount than the desired cabin pressure. During this range between sea level and eight thousand feet, this desired cabin pressure is at atmospheric pressure. It is necessary, however, to employ the compressor as previously explained to insure a flow of air through the cabin. While the aircraft is traveling between eight thousand and thirty thousand feet, the potentiometer 118 has no effect upon the control potentiometer 132. This is due to the fact that the slider 119 is in engagement with the conductive bar 122 so that the potential between slider 119 and the right-hand terminal of transformer 117 is at all times equal to the potential existing between the left-hand terminal of resistance 121 and the right-hand terminal of transformer 117. This is desirable since the cabin pressure which is to be maintained between eight thousand and thirty thousand feet corresponds to the atmospheric pressure at eight thousand feet.

After the plane has passed the thirty thousand foot elevation the pressure which can be selected by potentiometer 132 is again decreased due to the fact that the voltage which can be impressed across resistor 134 is increased. The resistor 120 is shown as uniform along its entire length. Under such circumstances, the minimum pressure which could be maintained by the manifold pressure selector would decrease more or less uniformly with height. Actually, this departs slightly from the theoretically desirable condition in which the differential between cabin pressure and atmospheric pressure is uniform throughout this range. Actually in practice, the departure is not material. If it is desired to obtain exactly the desired limiting effect of potentiometer 118 in this range, the effect can be obtained by either selecting a resistor 120 whose resistance is suitably non-uniform along its length or by employing a linkage between the bellows 131 and slider 119 which is effective to produce a non-uniform movement of slider 119 along the range of 30 to 40,000 feet.

It will be seen from the above that my system contemplates controlling the turbine so as to maintain a desired induction system pressure as determined by the position of a manual selector. The pressure which can be selected by this manual selector is, however, limited so that it is possible to insure the maintenance of a proper pressure within the cabin.

In spite of the fact that the pressure produced in the induction system is not lower than that necessary to maintain a desired cabin pressure, it is obvious that some means still is necessary to control the flow of air through the cabin from the induction system in such a manner as to maintain the desired cabin pressure at all altitudes. My invention also contemplates means for accomplishing this. This means will now be described.

As previously explained, the motor 166 is employed to position a valve 164 which is located in the conduit 151 connecting with conduits 150 and 153 leading to the airplane cabin 152. The operation of this motor 166 is controlled by amplifier 185 which causes winding 170 to be energized with current of a phase position depending upon the phase relation of the currents supplied to terminals 196 and 197 with respect to that supplied to winding 169 by the secondary 175. The voltage applied to terminals 196 and 197 is the output voltage of a composite resistance network consisting of two individual networks 200 and 201 previously described. These two networks 200 and 201 are connected in series between amplifier terminals 196 and 197 as follows: from terminal 196 through conductor 260, slider 234, network 201, slider 239, conductor 261, slider 216, network 200, slider 211 and conductors 262 and 263 back to the other terminal 197. The junction of conductors 262 and 263 is preferably grounded as at 264.

For convenience in understanding the operation of the networks, the half cycle is considered in which the lower terminal of secondary 203 is positive with respect to the upper terminal and in which the left-hand terminal of secondary 230 is positive with respect to the right-hand terminal. With the various elements in the position shown, the composite network is in balance. As previously noted, it is assumed that the plane is traveling at an elevation of four thousand feet. Under these conditions, the turbine pressure tends to assume atmospheric pressure which is substantially what is desired. However, in order to provide cabin ventilation, it is necessary to maintain the airplane cabin slightly above atmospheric pressure. For this reason it is necessary that valve 164 be slightly open. It is to be noted that the slider 234 is slightly to the right of its extreme left-hand position which is the position it assumes when valve 164 is fully closed. The slider 239 forms part of a means for reducing the pressure when it is desired. In the arrangement shown, it is at its sea level pressure position so that it is at the extreme right-hand end of resistor 238. As a result, slider 239 is slightly positive with respect to slider 234 during the half cycle being considered. The voltage of secondary 230 and particularly that between the left-hand end of secondary 230 and tap 236 is relatively small as compared with the voltage of secondary 203. As a result, the unbalance voltage is relatively small as compared with the unbalance voltages which may exist in connection with network 200.

Referring now to network 200, the slider 211 of the atmospheric pressure responsive potentiometer 205 is at a position corresponding to an altitude of 4,000 feet. The airplane cabin pressure, however, is slightly higher than the atmospheric pressure existing at four thousand feet, this being necessary in order to obtain any cabin ventilation. Thus, the slider 216 is close to the upper or negative end of resistance 215. In spite of this, the slider 205 is at a negative potential with respect to slider 216 due to the resistor 227. The effect of resistor 227 is to place the upper end of resistor 215 at a potential slightly positive with respect to the upper terminal of secondary 203. Thus, there exists across network 200 an output voltage which is opposite to that of network 201. Due to the greater voltage of secondary 203, the unbalance voltage of network 200 is equal to the unbalance voltage of bridge 201 so that the two voltages cancel each other out.

Within the range of sea level to 8,000 feet, the motor 166 is not appreciably brought into operation. Let it be considered, for example, that the airplane is rising from the elevation of four thousand feet to an elevation of eight thousand feet. During this travel, the slider 211 moves downwardly along resistor 209. At the same time, however, the cabin pressure is dropping due to the decreased atmospheric pressure outside so that slider 216 is moving downwardly with respect to slider 215. Thus, the only unbalance voltage of network 200 is the small amount of unbalance voltage previously discussed, which unbalance voltage is necessary to cause valve 164 to be maintained in a partially open position. While the movement of slider 119 of potentiometer 118 will tend to decrease the induction system pressure under these circumstances, this is desirable since the airplane cabin pressure is decreasing. Any tendency of the cabin pressure, however, to decrease excessively so that the desired differential between cabin pressure and atmospheric pressure does not exist results in slider 216 being moved downward sufficiently with respect to slider 211 to increase the unbalance voltage of network 200. In other words, the effect of this will be to make slider 211 more negative with respect to slider 206 to cause potential of terminal 197 of amplifier 185 to be lower with respect to terminal 196. The effect of this is to cause the motor winding 100 to be energized with current of such a phase position that the motor is operated to open valve 164. The opening movement of valve 164 is accomplished by a movement of slider 234 to the right to increase the unbalance voltage of network 201. The opening of valve 164 will tend to raise the cabin pressure and hence to move slider 216 upwardly to decrease the unbalance voltage of network 200. At the same time, the unbalance voltage of network 201 is increasing. As a result, the two unbalance voltages will assume equal values again, at which time the network is again balanced so that motor 166 is effectively deenergized.

While the sliders 211 and 216 of potentiometers 205 and 206 tend to travel together between zero and eight thousand feet, a different condition exists between eight thousand and thirty thousand feet. During this range of altitudes, both sliders 211 and 216 will move downwardly. The slider 211 is, however, traveling over the conductive bar 210 so that the potential between slider 211 and the upper terminal of secondary 203 remains unchanged. The slider 216 is, however, at the same time moving over the resistance 215 so that the voltage between slider 216 and the upper terminal of secondary 203 is constantly changing. As a result, the slider 216 becomes more positive with respect to slider 211 increasing the unbalance voltage already existing across network 200. The effect of such an increase in the unbalance voltage has already been considered. In other words such an unbalance voltage causes the motor 166 to be operated in such a direction as to open valve 164 and move slider 234 to the right. Such motion continues until the increased cabin pressure and the increase in unbalance of network 201 due to slider 234 results in the outputs of the two networks 200 and 201 being the same.

If at any time within the range of 4,000 to 30,000 feet, the plane descends, the pressure will tend to rise above the pressure desired to be maintained, namely, a pressure substantially corresponding to the pressure at an altitude of eight thousand feet. As a result, the slider 216 will assume such a position that the unbalance voltage tends to decrease. The effect of this is that the entire composite network is unbalanced in the opposite direction so that the potential of terminal 197 is increased with respect to that of terminal 196. This causes the amplifier 185 to supply winding 170 with current of the opposite phase so that the motor 166 drives valve 164 and slider 234 in directions opposite to that previously considered. In other words, valve 164 is moved towards closed position to decrease the flow of air to the cabin and slider 234 is moved to the left to decrease the unbalanced voltage of network 201. This continues until the increase in unbalance of network 200 resulting from the decreased cabin pressure acting on slider 216 and the decrease in unbalance voltage of network 201 due to movement of slider 234 causes the unbalance voltages to be equal again. As previously noted, the effect of potentiometer 231 is relatively small as compared with the effects of potentiometers 205 and 206. Hence, even though slider 216 returns to a position corresponding substantially to the desired pressure, the small change in unbalance voltage introduced by the deviation of this slider from this position is sufficient to offset the change in unbalance of network 201 necessary to produce the desired change in position of valve 164. Stated in other words, a very small change in the position of slider 216 is necessary to maintain a desired change in the position of valve 164.

Upon the aircraft ascending above 30,000 feet, the potentials of both sliders 211 and 216 with respect to the negative terminal of secondary 203 are changed, just as in the range of sea level to 8,000 feet. Thus, as in the range of 4,000 to 8,000 feet, there is a tendency for the pressure to decrease with atmospheric pressure. It is to be understood, however, that at the elevation of 30,000 feet the pressure maintained in the cabin is the pressure existing at 8,000 feet so that while the pressure in the cabin continually decreases, the differential between cabin pressure and outside pressure remains constant.

It will be seen from the above description that with the control system shown, the pressure is maintained at substantially atmospheric pressure between sea level and 8,000 feet, that a pressure corresponding to atmospheric pressure at 8,000 feet when the aircraft is between elevation of 8,000 to 30,000 feet, and at a pressure when the aircraft is above 30,000 feet such that there is a differential between cabin pressure and atmospheric pressure equal to the differential which existed at 30,000 feet.

In the preceding description, the function of potentiometer 232 has not been described. As previously indicated, this potentiometer is provided for the purpose of decreasing the cabin pressure below that automatically selected. Potentiometer arm 239 is shown in the drawing in the position in which it is normally set. When it is desired to lower the pressure, the knob 249 of the manually operated potentiometer 246 is rotated in a clockwise direction. Such rotation of the knob 249 initially has no effect upon the proportioning motor 242 since slider 248 is simply moved along the conductive bar 270. As previously pointed out, it is impossible by reason of the stop bar 272 for the slider 248 to be moved beyond the conductive bar 270 until an altitude of over 8,000 feet has been reached. Let it be assumed that the craft is traveling at an altitude of 12,000 feet. Under normal conditions, the cabin pressure control system is operating to maintain within the cabin a pressure corresponding to an altitude of 8,000 feet. In other words, there is a pressure differential between the interior of the cabin and the atmosphere corresponding to an altitude differential of 4,000 feet. If the operator now desires to reduce this pressure, the knob 249 is rotated so that the slider 248 goes over conductive bar 270 onto resistance 247 to an extent corresponding to the desired reduction. This causes the voltage between conductors 250 and 252 to be increased and that between conductors 251 and 252 to be decreased. As a result, the timing motor is caused to move the slider 239 with respect to resistor 238. This movement does not occur, however, as rapidly as the slider 248 is moved due to the fact that the motor 242 is designed to move slider 239 at a slow predetermined rate. In one typical system the motor 242 is designed so as to move slider 239 at a rate corresponding to an altitude change of 1200 feet per minute. Such an altitude change is the maximum altitude which can be permitted without undue discomfort to certain of the occupants of the aircraft. Thus, upon slider 248 being moved to the right with respect to resistance 247, the slider 239 is slowly moved to the left. Such a movement of slider 239 results in the slider 239 becoming more positive with respect to the slider 234. It will be recalled that this is the effect which results in the motor rotating the valve 164 to closed position. The resulting reduction in pressure tends to move slider 216 downwardly with respect to resistor 215 to cause the unbalance voltage of network 200 to be increased. This tends to cause the composite network to be rebalanced. At the same time as the motor is moving valve 164 to closed position, the slider 234 of the rebalancing potentiometer 231 is moving to the left so as to decrease the unbalancing of network 201. The combined effect of the rebalancing potentiometer 231 and that of cabin pressure responsive potentiometer 206 results in the entire network being balanced with the cabin pressure at a lower value than it previously assumed. The portion of the secondary 230 across which potentiometer 232 is connected is so selected in value with respect to the portion of secondary 230 across which potentiometer 231 is connected that the movement of slider 239 across the full length of resistor 238 will produce a maximum cabin pressure change equivalent to the difference between atmospheric pressures at 8,000 to 30,000 feet. Thus, when the plane is operating at 30,000 feet and the stop rod 272 is withdrawn sufficiently far to permit slider 248 to travel the full length of resistance 247 so as to permit slider 239 to travel the full length of resistance 238, the reduction in pressure in the cabin which is affected by such travel is a reduction in pressure from the pressure existing at 8,000 feet to that existing at 30,000 feet. With this arrangement, it is accordingly possible at that time to reduce the cabin pressure from the pressure then being maintained to any desired lower pressure so long as the desired pressure is not below atmospheric pressure. Furthermore, such a change in the cabin pressure will be effected at a timed rate which would not produce severe discomfort to the occupants of the cabin.

Species of Figure 2

The species of Figure 2 differs from that of Figure 1 in the control means for the cabin pressure and the manner in which this control means is employed to influence the induction system pressure. In the arrangement of Figure 2, the flow of air to the cabin is controlled to provide a relatively constant flow and the flow of the air out of the cabin is controlled to provide the desired pressure within the cabin. Furthermore, a somewhat different means is provided for controlling the manual reduction in cabin pressure and for limiting the pressure which can be selected.

In view of the fact that most of the apparatus for controlling the waste gate associated with the turbine is identical to that employed in Figure 1, the same reference characters have been employed in referring to elements which are identical to those in Figure 1. Furthermore, these elements are not described again in connection with Figure 2.

The reference numeral 318 is employed to designate a potentiometer similar in function to potentiometer 118 of the species of Figure 1. This potentiometer comprises a slider 319 movable in slidable engagement with a resistance element 320 which is connected by conductors 323 and 324 to the opposite ends of secondary 117. The slider 319 is connected by a threaded shaft 326 to a gear train 327 which is driven by a motor 328 in a manner which will be subsequently explained. The manual selectior potentiometer 132 in the present species is connected between slider 319 and the right hand terminal of secondary 117, in the same manner as in the species of Figure 1, by conductors 330 and 331.

In the present species, a portion of the cabin is shown in section, the cabin wall being indicated by the reference numeral 335. The conduit 151 leads through this cabin wall 335. A motor operated valve 338 controls the flow of air through conduit 150. It is to be understood that a similar valve (not shown) is provided in connection with conduit 153 leading from the supercharger of engine #3. The valve 338 is operatively connected to a motor and gear train 339 which is energized from the secondary winding 340 associated either with the main transformer 44 or some other transformer connected to any suitable source of power. The motor and gear train 339 are provided with three control terminals 341, 342 and 343. The connections of these terminals are controlled by a differential pressure responsive switch generally indicated by the reference numeral 350. This switch comprises a switch blade 351 movable between contacts 352 and 353. The switch blade 351 is connected to a link 354 which extends between two opposed bellows 355 and 356. Bellows 356 is connected to a conduit 357 which extends through the cabin wall 335 so as to subject the interior of bellows 356 to the cabin pressure. The bellows 355 is connected by a conduit 358 to a portion of the discharge conduit 150 spaced a substantial distance from the cabin so that the difference in pressures in bellows 355 and 356 corresponds to the pressure drop through a section of conduit 150. The differential pressure system switch 350 operates to control the energization of motor 339 so as to control valve 338 in such a manner as to maintain a constant flow of air through conduit 150, as will be explained in more detail in connection with the operation.

A conduit 360 extends from the interior of the cabin to the atmosphere to provide for escape of the air from the cabin. A valve 361 is located within this conduit and is operatively connected to a gear train 362. The gear train in turn is driven by a motor 363. The motor is shown as being of the induction type having a rotor 364 and a pair of field windings 365 and 366 which are connected together and are connected to ground by a conductor 367. The motor winding 365 is connected to the output terminals 368 and 369 of an amplifier 370. This amplifier is of the same type as amplifiers 62 and 185 in the species of Figure 1. In other words, the amplifier is of a type which will produce an output voltage having a phase relation depending upon the phase relation of the input voltage. The amplifier has, besides the output terminals 368 and 369, power supply terminals 372 and 373 and input terminals 374 and 375.

The amplifier and motor are energized by means of a transformer 380. This transformer comprises a primary winding 381 and a pair of secondary windings 382 and 383. The primary winding 381 is connected to any suitable source of alternating power (not shown). The secondary winding 382 is connected by means of conductors 384 and 385 with the input terminals 372 and 373. The secondary winding 383 is connected by means of conductors 386, 387 and 387 to the opposite terminals of field winding 366. Thus, the motor field winding 366 is constantly energized by current of a fixed phase. The other field winding 365 is energized by the amplifier with a current whose phase position is dependent upon the phase position of the voltage applied to the input terminals 374 and 375 of amplifier 370.

The voltage applied to the input terminals 374 and 375 is the output voltage of a composite resistance network consisting of individual networks 390 and 391. The network 390 is in the form of a bridge consisting of a secondary winding 392 and two potentiometers 393 and 394. Secondary winding 392 may constitute an additional winding of transformer 380 or the winding of a further transformer energized from the same source of power as primary 381. The potentiometer 393 comprises a resistance 395 and a slider 396. The slider 396 is connected by means of a shaft 397 to the gear train 362 so as to be moved whenever the motor 363 is operated to move the valve 361. The potentiometer 393 operates as a rebalancing potentiometer in a manner which will be fully described later. The potentiometer 394 constitutes the main controlling potentiometer and consists of a resistor 398 and a slider 399. The slider 399 is positioned by means of a bellows 400 which is evacuated and is located within the cabin so as to be responsive to cabin pressure. The bellows 400 operates against a spring 401 which is adjustable by means of a screw 402 extending through a suitable support 403. Upon any increase in cabin pressure, the slider 399 is moved by the spring 401 to the right along the resistance 398. Upon a decrease in cabin pressure, the bellows 400 expands and moves slider 399 to the left against the action of spring 401.

The network 391 consists of a secondary 410 and a further potentiometer 411. Again, the secondary 410 may constitute an additional secondary of transformer 380 or a secondary of another transformer providing that it is energized by the same source of alternating current as is primary winding 381.

The potentiometer 411 consists of a resistor 412 and a slider 413. The slider 413 is actuated by timing mechanism of the type more fully disclosed in the application of Albert E. Baak, Serial No 541,583, filed of even date herewith. This timing mechanism is shown only schematically in the present application. The slider 413 is secured to a block 414 which has a threaded opening through which extends the threaded rotatable shaft 326 connected to gear train 327. The block 414 carries a pair of resilient contact blades 416 and 417. Cooperating with blades 416 and 417 are a pair of blades 418 and 419, respectively. These blades are secured to the opposite sides of a pointer 420 which is rotated by means of a knob 421. The pointer 420 cooperates with a scale 422.

The motor 328 referred to above is a direct current motor having a wound armature 425 with which are associated the brushes 426 and 427. Also cooperating with the armature 425 are a pair of field windings 429 and 430. The motor rotates in either direction, depending upon which winding is energized. Connected in series with the rotor 425 and controlling the flow of current therethrough is a rheostat consisting of a resistor 432 and a contact arm 433 movable over the resistor 432. This rheostat is employed to vary the current flowing through the armature 425 and hence to vary the speed of operation of motor 328.

A battery 435 is employed to energize the motor. Any other conventional source of direct current may be employed. A manually operable switch 436 controls the connection of the battery to the motor.

A differential pressure switch is generally indicated by the reference numeral 440. This switch consists of a switch blade 441 movable between two opposed contacts 442 and 443. Switch blade 441 is secured to a pivoted arm 445 which is urged into engagement by a spring 444 with bellows 446. The bellows 446 is provided with a spring 447 therein. The interior of the bellows, being located in the cabin, is subjected to cabin pressure. The interior of the bellows is subjected to atmospheric pressure in that it is located adjacent to an opening 448 extending through the wall 335 of the cabin.

*Operation of species of Figure 2*

As previously indicated, the valve 338 in the line 150 is so regulated as to maintain a constant flow of air to the cabin as long as the pressure in the induction system is adequate to maintain the desired cabin pressure. As will be explained hereinafter, means are provided to insure that the induction pressure will always be maintained at least at such a value. The valve 338 is positioned by motor 339 which is controlled by the differential pressure switch 350. With the elements in the position shown, the switch blade 351 occupies a position intermediate contacts 352 and 353. Upon a decrease in the pressure drop through conduit 150, the switch arm 351 is moved into engagement with contact 352. This causes terminals 342 and 343 to be connected through conductors 450, switch blade 351, contact 352 and conductor 451. Whenever terminals 342 and 343 are thus connected, the motor is operated in such a direction as to cause valve 338 to move towards open position. This tends to reduce the impedance to air flow so that the flow of air is increased. Whenever the pressure drop through conduit 150 increases indicating that an increase in the flow of air through conduit 150 is taking place, the switch 351 is moved into engagement with contact 353 establishing a circuit between terminals 342 and 341 as follows: from terminal 342 through conductor 450, switch blade 351, contact 353 and conductor 452 back to the other terminal 341. Whenever terminals 342 and 341 are thus connected, the motor tends to operate in such a direction as to thus reduce the 338 towards closed position to thus reduce the flow of air through the conduit 150. Thus, the valve 338 is moved in one direction or another upon any change in the pressure differential between the junction of conduits 150 and 358 and the cabin so as to maintain a relatively constant flow of air through conduit 150 regardless of such change in cabin pressure.

The apparatus for controlling the pressure within the cabin will now be described. As previously indicated, the voltage applied between the amplifier input terminals 374 and 375 is the unbalance voltage of the composite network consisting of networks 390 and 391. These two networks are connected between terminals 374 and 375 in series as follows: from terminal 374 through conductor 455 to the center tap 456 of secondary 410, through the network 391, contact arm 413, through conductor 457, slider 399, the network 390, slider 396, and conductor 458 to the other input terminal 375. The various elements of the cabin pressure control system are shown in the position assumed when the airplane cabin is at the desired pressure intermediate between sea level pressure and atmospheric pressure. With the system of the present invention, this pressure is not automatically changed but is maintained constant until changed by means of a manual actuator constituting a part of the timing mechanism previously referred to.

With the elements in the condition shown, the composite network is balanced due to the fact that the network 390 is balanced and the slider 413 is in a position substantially midway between the ends of resistor 412. Let it be assumed now that for some reason or other the pressure within the cabin drops. This will cause a movement of slider 399 to the left. If the conditions are examined during the half-cycle in which the left-hand terminal of secondary 392 is positive with respect to the right-hand terminal, this movement of slider 399 tends to cause it to become positive with respect to slider 396. This in turn will cause the potential of terminal 374 to be raised with respect to terminal 375. It is of course to be understood that actually an alternating voltage is applied between terminals 375 and 374 due to the fact that secondary 392 supplies an alternating voltage to the network 390. This alternating voltage is of such phase relationship that the motor 363 is operated in a direction such as to cause movement of valve 361 towards closed position so as to decrease the escape of air from the cabin. This movement of valve 361 will be accompanied by the movement of slider 396 to the left so as to tend to rebalance network 390. At the same time, the effect of the change of the pressure in the cabin will influence bellows 400 to cause slider 399 to return in the direction of the right-hand terminal of resistance 398. The combined effects of rebalancing potentiometer 393 and control potentiometer 394 will result in network 390 being rebalanced so that no voltage is applied between terminals 375 and 374. The motor 363 will then be deenergized.

If, on the other hand, there is a rise in cabin pressure, the slider 399 will be moved to the right so as to cause an unbalance of the network 390 in the opposite direction. The alternating voltage applied between terminals 374 and 375 will accordingly be opposite in phase from that applied with the conditions previously considered. The motor 363 will hence be rotated in the opposite direction to move valve 361 to open position so as to permit a greater escape of air from the aircraft through conduit 360. At the same time, slider 396 will be moved to the right tending to rebalance network 390. Again, due to the change in pressure in the cabin which will affect the slider 394 due to the action of rebalancing potentiometer 393, the network 390 will be rebalanced when a movement of valve 361 necessary to effect the desired change in cabin pressure has taken place.

It will thus be seen that normally the cabin pressure is maintained at a constant value by operation of the discharge valve 361. However, as pointed out in connection with the species of Figure 1, it is desirable that the cabin pressure be changed as the plane operates in different altitudes. Whenever the pilot desires to change the cabin pressure the knob 421 is rotated in one direction or the other depending upon the desired direction of cabin change. When the knob 421 is rotated in a clockwise direction, the cabin pressure is decreased and when it is rotated in a counterclockwise direction, the cabin pressure is increased. Let it be assumed first that it is desired to increase the cabin pressure. In such event, the knob 421 is rotated to bring the switch blade 418 into electrical engagement with the switch blade 416. The switch blades 416 and 418 are resiliently secured to block 414 at their upper ends so as to be freely yieldable. The pointer 420 is rotatably secured on a shaft through a slip friction connection so that upon pointer 420 being moved in either direction it will remain in the position to which it is moved until it is again manually moved. In other words, it is capable of remaining in the position to which it is moved against the tension of either switch blade 416 or 417 as the case may be. Thus, switch blade 418 is maintained in electrical connection with switch blade 416. The engagement of these two switch blades causes a circuit to be established to motor field winding 429 as follows: from the positive terminal of battery 435 through conductor 459, switch blade 441, contact 443, conductor 460, contact blades 418 and 416, conductor 462, field winding 429, conductors 463 and 464, switch 436 and conductor 465 to the negative terminal of battery 435.

The energization of motor field winding 429 causes motor 328 to move the block 414 in such a direction as to move slider 413 and contact arms 416 and 417 to the right. This movement will take place at a timed rate dependent upon the setting of the rheostat consisting of resistor 432 and contact arm 433. After there has taken place a movement of block 414 corresponding in magnitude to the original movement of pointer 420, switch blade 416 will separate from switch blade 418 so that the circuit traced to field winding 429 will be interrupted at which time further movement of block 414 will stop. As a result of the movement of block 414, the slider 413 will have been moved to the right with respect to resistor 412 a distance corresponding in magnitude to the movement of pointer 420. The secondaries 410 and 392 are so associated with the source of supply that the left-hand terminals are always positive with respect to the right-hand terminals at the same time. Thus, during the half-cycle previously considered, the movement of slider 413 to the right will cause the center tap 456 to become positive with respect to slider 413. The effect of this is to produce an unbalance voltage of the same character as existed when the pressure within the cabin decreased. It will be recalled that the phase of the unbalance voltage in such case resulted in the amplifier energizing the field winding 365 in a manner to cause the motor 363 to move the valve 361 towards closed position, thereby permitting less escape of pressure from the airplane cabin. Thus, the effect of moving pointer 420 to the right is to cause valve 361 to be moved to closed position to increase the pressure in the cabin. This decrease in pressure in the cabin will cause a movement of slider 396 to the left. At the same time, an increase in cabin pressure will cause slider 399 of the pressure responsive potentiometer 394 to be moved to the right. These two actions result in an unbalance voltage which when a certain position of valve 361 is reached will be equal to the unbalance voltage caused by movement of slider 413. Thus, valve 361 will be moved to a position corresponding to the new position of slider 413, at which position the new higher pressure is maintained. The increase in pressure, moreover, has been accomplished at a gradual rate dependent upon the rate of movement of slider 413 by motor 328. This rate of change of pressure is determined by the setting of rheostat slider 433 with respect to resistor 432.

If on the other hand, it is desired to decrease the cabin pressure, the pointer 420 is rotated to the left so as to bring contact blade 419 into electrical engagement with contact blade 417. Again, the blade 417 will deflect by an amount necessary to permit the desired movement of pointer 420. An energizing circuit to field winding 430 will now be established, this circuit being as follows: from the positive terminal of battery 435 through conductors 470 and 471, contact blades 419 and 417, conductor 473, field winding 430, conductors 474 and 464, switch 436, and conductor 465 to the negative terminal of battery 435. With motor field winding 430 energized, the motor 328 will rotate in a direction opposite to that previously considered so that the block 414 will move to the left. This will cause movement of slider 413, switch blades 416 and 417 to the left. Such movement will continue at a timed rate until contact blade 417 has separated from contact blade 419. The slider 413 will now be in a new position dependent upon the amount of movement of pointer 420, this position being to the left of that previously occupied. The effect of the movement of slider 413 to the left is to create an unbalanced voltage opposite to that previously considered so as to cause the motor 363 to rotate the valve 361 towards open position. The rotation of valve 361 towards open position causes a decrease in the cabin pressure which in turn will cause a movement of slider 399 to the left. At the same time, the slider 396 of the rebalanced potentiometer 393 is moved to the right. The effect of this is that the network 390 is unbalanced and when the valve 361 has reached a position corresponding to the movement of slider 413 to the left, the unbalance voltage of network 390 will be equal and opposite to the unbalanced voltage of network 391. When this condition exists, the cabin pressure will be at a lower value corresponding to the new setting of slider 413.

It will be seen from the above that provision is made for manually adjusting the cabin pressure at a desired rate either upwardly or downwardly. Provision is at the same time made for insuring that the differential between cabin pressure and atmospheric pressure can never become excessive. Otherwise, it might be possible to cause the existence of a cabin pressure of such a high value that the cabin walls would not be able to withstand the differential between cabin and atmospheric pressure. The differential pressure switch 440 is provided for this purpose. Normally, the switch blade 441 of the differential pressure switch is in the position indicated in which it is in engagement with contact 443.

Let it be assumed, however, that the differential pressure becomes excessively high, either through the operator selecting a high pressure by the mechanism just described or by reason of the plane ascending to a relatively high altitude while a constant pressure is being maintained therein. Under these conditions, the switch blade 441 will move from engagement with contact 443 into engagement with contact 442. This will do two things. In the first place, a circuit traced through winding 429 will be interrupted so that it will be impossible to maintain this circuit by the engagement of contacts 416 and 418. Thus, if the undue differential in pressure has been caused by the operation of the adjusting mechanism, the circuit to motor 328 causing the undesirable adjustment is immediately interrupted. At the same time, a circuit is established to the other motor field winding 430 independent of the manual operator as follows: from the positive terminal of battery 435 through conductor 459, switch blade 441, contact 442, conductor 476, field winding 430, conductors 474 and 464, manual switch 436, and conductor 465 to the negative terminal of battery 435. The energization of motor field winding 430 causes the motor to be energized in such a manner as to cause block 414 to be moved to the left which also results in the movement of slider 413 to the left. As previously pointed out, however, such a movement of slider 413 causes an unbalance in composite network in such a manner as to cause a reduction in the air pressure within the cabin. Such movement of the block 414 will continue until the pressure within the cabin has dropped sufficiently to move switch blade 441 out of engagement with contact 442. Thus the differential pressure switch 440 operates automatically to insure against an excessive differential between cabin and atmospheric pressure.

The slider 319 of potentiometer 318 is moved simultaneously with the slider 413 of potentiometer 411 whenever the manual adjusting mechanism is operated to change the position of the latter slider. Hence, the positions of sliders 319 and 413 always correspond. As will be recalled from the description of the species of Figure 1, the analogous potentiometer 118 was employed to limit the minimum pressure which could be set by the selector potentiometer 132. The potentiometer 318 is provided for the same purpose. In the species of Figure 1, the cabin pressure was adjusted in accordance with atmospheric pressure and the potentiometer 118 was likewise adjusted. In the present case, the cabin pressure is adjusted in accordance with the manually operable timing mechanism described above. The potentiometer 318 is accordingly so adjusted. Any movement of slider 319 to the left will decrease the induction system pressure as long as slider 133 is to the left of its extreme right-hand position. This is desirable since a reduction in cabin pressure makes it usually possible to lower the induction system pressure. If for any reason the induction pressure is too low for engine operation, the manual selector 132 can be adjusted to maintain a higher induction system pressure. Conversely, when slider 319 is moved to the right, the induction system pressure that is maintained is increased. This again is also desirable since the slider 319 is moved in this direction at the same time that the slider 413 is moved in a similar direction to increase the cabin pressure. Again, if a higher cabin pressure is necessary, it is usually necessary to raise the induction system pressure. Thus, means are provided to limit the minimum induction system pressure which can be selected in accordance with the cabin pressure which is to be maintained.

Because of the tendency for the cabin pressure and induction system pressure to be adjusted simultaneously, the change in cabin pressure normally has no appreciable effect upon the operation of valve 338 by differential pressure switch 350. In other words, while the cabin pressure is lowered the induction system pressure is likewise lowered so that the differential switch 350 is relatively unaffected. The differential pressure switch is operative to adjust the position of valve 338 primarily when there is some abnormal fluctuations in either the induction system pressure or the cabin pressure, the adjustment being made for the purposes of maintaining a uniform flow rate rather than for affecting the cabin pressure.

*Species of Figure 3*

The species of Figure 3 is concerned with means for compensating the operation of the induction system pressure regulating means for the various engines as the throttles are adjusted. As has been previously noted, the cabin pressure is maintained by the superchargers associated with the No. 2 and No. 3 engines. Furthermore, as has been pointed out, some means indicative of the cabin pressure is employed to insure that the manual selector of the induction system pressure cannot be operative to select a pressure below that required to maintain the cabin pressure at the desired value. It will be obvious that under many conditions of operation, the induction system pressure and consequently the manifold pressure that results is higher than that desirable from a standpoint of engine operation. Consequently, it becomes necessary for the operator to retard the throttle of the associated engine. This tends to cause a reduction in the amount of exhaust gases available for operation of the turbine so that for a given waste gate setting, the induction system pressure maintained will be lowered. As will be noted from the description of the induction system pressure control arrangement of Figure 1, the system tends to maintain a given waste gate position for a given induction system pressure. Obviously if the amount of exhaust gases is materially decreased, the pressure that is maintained in the induction system will correspondingly decrease due to the lack of motive power. Hence, for a given setting of the main selector a lower induction system pressure will tend to be maintained. On the other hand, in those engines whose throttles are not retarded, an excessive induction system pressure will result. In the arrangement of Figure 3, means are provided for lowering the pressure settings of the induction system regulating means for those engines whose throttles are retarded and for raising the settings of the regulating systems for the other engines. Specifically, the compensating means is operated in conjunction with the throttles of the No. 2 and No. 3 engines, the engines whose superchargers are employed to pressurize the cabin. Furthermore, in the arrangement of Figure 3, the means for preventing the induction system pressure from being lower than a predetermined value is responsive directly to cabin pressure instead of to atmospheric pressure as in the species of Figure 1 or to a position of a manual adjustor as in the species of Figure 2.

The induction system control networks for the various engines are identical with that shown and described in connection with Figure 1, with the exception of the addition of the compensating potentiometers. The elements of the induction system control network in engine No. 2 which are identical to those of Figure 1 have been given identical reference characters. The elements for the induction system control networks of engines No. 1, 3 and 4 have been given the same numerals with the suffix letters a, b, c, respectively. With this understanding, it is believed unnecessary to specifically describe these previously explained portions of the induction system networks.

Referring first to that portion of the system which is common to the control systems of the various superchargers, there is connected across the secondary 117 a potentiometer 518 which corresponds in function to the potentiometer 118 of the species of Figure 1 and 318 of the species of Figure 2. The potentiometer 518 comprises a slider 519 and a resistor 520. The slider 519 is pivotally mounted at 521 and is connected to a link 522. The link 522 is operatively associated with two opposed bellows 523 and 524. The interior of the bellows 524 is connected by a tube 525 to the interior of the cabin (not shown). Bellows 524 is thus at all times subjected to cabin pressure. The bellows 523 is an evacuated bellows which is affected only by atmospheric pressure. Since both of the bellows 523 and 524 are equally affected by atmospheric pressure, it will be obvious that the position of link 522 is not affected by atmospheric pressure so that the position of link 522 and hence of slider 519 is determined solely by the cabin pressure. One terminal of a resistor 134 of the pressure selecting potentiometer 132 is connected by a conductor 526 to the slider 519 of potentiometer 518. The other terminal or resistor 134 is connected by a conductor 527 to the lower terminal of resistor 520 of the potentiometer 518. The slider 133 is connected by a conductor 529 to ground at 528. Since input terminals 67, 67a, 67b and 67c of the amplifiers 62, 62a, 62b, and 62c are also grounded, the slider 133 is hence connected to each of these terminals.

It will be obvious that the potentiometer 518 has the same effect as potentiometer 118 of Figure 1 and 318 of Figure 2. The maximum amount of voltage change that can be introduced by the pressure selector potentiometer 132 is dependent upon the position of slider 519. It will be recalled that the movement of slider 133 to the left causes a decrease in the induction system pressure by moving the waste gate towards open position. Obviously, the further slider 519 can move towards the upper end of slider 520, the greater can be the effect of potentiometer 132 when slider 133 is moved to the left. Hence, the further slider 519 is moved upwardly, the lower will be the pressure which can be selected by potentiometer 132. Upon a decrease in cabin pressure, the slider 519 is moved upwardly so as to permit the induction system pressure to be lowered further by the pressure selector potentiometer 132. Similarly, whenever the cabin pressure is raised, the minimum induction system pressure that can be selected is also raised. Not only is the value of the minimum pressure raised but unless slider 133 is at its extreme right-hand end the movement of slider 519 tends to effect an immediate change in the value of the induction system pressure.

In Figure 3, no particular means is shown for controlling cabin pressure. It is to be understood that either the arrangements of Figures 1 or of Figure 2 could be employed. Other means for controlling the cabin pressure could also be employed if desired.

As has been previously explained, the secondary 117 and the pressure selecting potentiometer 132 constitute a part of all of the control systems for the turbo superchargers. Except for the secondary 117, the pressure selector potentiometer 132 and the limiting potentiometer 518, the control system for each engine is separate and distinct. Referring now to the control system for the No. 2 engine, the elements of this system are identical to that shown in Figure 1 with the exception of the addition of a further network 530 which is interposed between the calibrating potentiometer 135 and the control potentiometer 94. This network 530 comprises a secondary 531 and a plurality of potentiometers 532 and 533. The potentiometer 532 is a manually operable adjustable potentiometer and comprises a resistance 534 and a slider 536. The resistance 534 is connected by conductors 542 and 543 to the opposite terminals of secondary 531. The potentiometer 533 consists of a resistor 537 terminating at its right-hand end in a conductive bar 538. Also included in the potentiometer 533 is a slider 539 pivotally mounted at 540 and movable in slidable engagement with the conductive bar 538 and the resistor 537. A link 541 extends between the slider 539 and the throttle lever 23. The throttle 16 is illustrated in its wide open position. Upon the throttle lever 23 being moved to the left to move throttle 16 towards closed position, the slider 539 is moved to the left with respect to resistor 537. The effect of potentiometer 533 is determined by the setting of slider 536, one end of resistor 537 being connected by conductor 544 to the slider 536 and contact bar 538 being connected by conductor 545 to the right-hand end of resistor 534.

Referring now to the control system for engine No. 1, the portion of the system which is concerned solely with the control of that engine differs from the corresponding portion of the system shown in Figure 1 only in the position of a network 550 between the calibrating potentiometer 141 and the control potentiometer 94a. This potentiometer 550 likewise comprises a secondary 551 and two potentiometers 552 and 553. The potentiometer 552 is a manually adjustable potentiometer consisting of a resistor 554 and a slider 556. The resistor 554 is connected by conductor 564 and 565 to the opposite terminals of secondary 551. The left-hand terminal of secondary 551 is further connected by a conductor 556 to the slider of calibrating potentiometer 141. The potentiometer 553 consists of a resistor 557, a conductive bar 558, and a slider 559 movable with respect to the bar and the resistor. One end of resistor 557 is connected by a conductor 569 to the slider 556. The contact bar 558 is connected by a conductor 567 to the left-hand terminal of resistor 554. Slider 519 is also connected to the throttle lever 23 for engine No. 2. A connection is effected by means of two links 560 and 561, and a lever 562 pivoted at its mid point. The link 560 connects one end of lever 562 to the slider 559 and the link 561 the other end of slider 562 to lever 23. It will be obvious that upon movement of lever 23 to the left to close throttle 16, lever 559 is moved to the right.

Considering now the control system for engine No. 3, this is similar to that for engine No. 2, the only difference being that instead of the resistance network 531, there is connected into the system a network 593b. Each of the elements of this network are identical to the elements of the network 530 and have been given the same numerals with the suffix letter b to indicate their use in connection with engine No. 3. It is believed unnecessary to describe these elements in detail. It is to be noted, however, that the slider 539b is connected to lever 23b and is actuated in the same direction and in the same manner as slider 539 upon throttle lever 23b being moved towards throttle closed position.

Considering now the controls for engine No. 4, these controls include a network 550c which corresponds in arrangement and function to the network 550 in connection with the controls for engine No. 1. Again, the elements of this network are identical to the elements of network 550 and so the same reference numerals have been employed in referring to these elements as were employed in referring to the elements of network 550, the suffix letter c being added to the numerals in this case to denote their use in connection with the controls for engine No. 4. As with network 550, the slider 559c is moved to the right upon the throttle being moved in throttle closing direction.

*Operation of species of Figure 3*

The various controls are shown in the position assumed when the throttles for both the No. 2 and No. 3 engines are entirely open and when the cabin pressure is at some intermediate value. Under these conditions, the amount of voltage that can be introduced by the pressure selecting potentiometer 132 is limited by the position of slider 519, as previously explained. If a lower cabin pressure is selected through either an automatic or through some manually operated selecting mechanism such as shown in Figure 2, the slider 519 will move upwardly to permit the selection of a lower induction system pressure. If the cabin pressure is raised, on the other hand, the slider 519 will move downwardly to prevent the selection of as low an induction system pressure. The pressure selector potentiometer, as also previously explained, affects the control systems for all four engines so that any change in the pressure selected either by action of pressure selecting potentiometer 132 or the limiting potentiometer 518 causes an equal change in the pressures maintained in all of the engines.

It will be obvious that since the minimum pressure which can be maintained is dependent upon the cabin pressure, it may well often happen that the manifold pressure is higher than that desired. As a consequence, it is necessary for the pilot to retard the throttle in order to increase the pressure drop between the induction system and the inlet to the direct driven compressor, so as to decrease the manifold pressure to a value desirable for engine operation. Such a reduction in the throttle position decreases the amount of exhaust gases, however, and tends to cause a lower induction system pressure for a given setting of the waste gate. It will be recalled from a description of the control arrangement for the induction system in connection with Figure 1 that if the other potentiometers are not adjusted the control system tends to maintain a given waste gate position for a given position of the main control potentiometer 94, which in turn assumes a definite position corresponding to induction system pressure. In other words, if for any reason the induction system pressure does drop, the waste gate is moved towards closed position but is maintained in a more nearly closed position only so long as the induction system pressure is lower than that desired. Thus, while the departure from the desired induction system pressure is small, there is nevertheless a definite departure whenever the conditions are such as to require waste gate position other than the average waste gate position selected as the operating point. This necessary departure of the controlling condition from the desired value upon a change in the load is a characteristic of any proportioning system and is commonly called the "droop." It will be obvious that anything which demands that the waste gate go to an even more closed position in order to maintain a given induction system pressure will increase this "droop." The closing of the throttle with the resulting reduction in the total amount of exhaust gases will obviously increase this effect. While a certain amount of "droop" is desirable in connection with airplane manifold pressure control systems since it is desirable for the purpose of maximum power to maintain lower manifold pressures as higher altitudes are reached, the amount of "droop" can be excessive when the throttle is retarded. The potentiometers 533 and 633b are provided for the purpose of compensating for this droop.

When the pilot finds it necessary to retard the throttles 16 and 16b of No. 2 and No. 3 engines, the sliders 539 and 539b are automatically moved to the left. The movement of slider 539 to the left has the same effect as the movement of the pressure responsive potentiometer slider 104 to the right, which is the direction in which it is moved upon a drop in induction system pressure. As explained in connection with Figure 1, the ultimate effect of this is to cause the waste gate to assume a position closer to fully closed position so as to increase the amount of exhaust gas flowing through the turbine and hence to raise the speed of the turbine and the resultant induction system pressure. Thus, with no change in the position of slider 104 of the controlling potentiometer 94, the waste gate is moved to a position tending to increase the induction system pressure. Actually, no increase in the induction system pressure takes place because of the fact that the condition which resulted in the movement of slider 539 to the left, namely the movement of throttle 16 to closed position, also produced a reduction in the amount of exhaust gas so that for a given position of the waste gate, a lower induction system pressure would be maintained. The total voltage across resistor 537 is adjusted by adjusting the position of slider 536. Hence, the compensating effect of potentiometer 533 is adjusted by potentiometer 532. In initially setting up the apparatus in an airplane, the slider 536 is so adjusted that the compensation introduced by the potentiometer 533 upon a given throttle movement exactly corresponds to the decreased effect in the exhaust gases resulting from the closing of the throttle. Thus, as the throttle 16 is moved towards closed position, the induction system pressure at any given waste gate position remains unchanged, despite the reduction in the amount of exhaust gas.

The network 530b has exactly the same effect upon the control system for engine No. 3 as network 530. It is to be noted that the two networks are connected into their control systems in identically the same manner and the potentiometers are moved in the same way upon movements of the respective throttle levers towards closed position. Hence the movement of the throttles for either the No. 2 or the No. 3 engines towards closed position does not in any way affect the induction system pressure that is maintained. The only effect that does result is a reduction in the manifold pressure, which is what is desired.

Considering now the control system for the engine No. 1, a somewhat different condition exists when the throttle for engine No. 2 is moved to closed position. The amount of exhaust gases flowing to the turbine of engine No. 1 remains the same because engine No. 1 has not been affected. On the other hand, the manifold pressure is excessively high because of the effect of the pressure selector potentiometer 132. While in the case of engines No. 2 and 3, it is impossible to reduce the manifold pressures by reducing the induction systems pressures, this difficulty does not exist in connection with engines No. 1 and 4 since the superchargers of these engines are not employed for cabin supercharging and ventilation purposes. Consequently, the present system provides means operative when the throttle for engine No. 2 is retarded to automatically reduce the induction system pressure of engine No. 1.

Referring particularly to the apparatus as illustrated in the drawing, it will be noted that when the throttle lever 23 is moved to the left, the slider 559 of potentiometer 553 is moved to the right. This produces the same effect as though slider 104a of the induction system pressure responsive potentiometer 94a moves to the left as on an increase in induction system pressure. As previously explained, the movement of slider 104a to the left causes the waste gate of the associated turbine to move towards open position to decrease the induction system pressure. Hence, the movement of throttle lever 23 to the left automatically resets the turbine control system to reduce the induction system pressure in connection with engine No. 1. This reduction in induction system pressure is, to a certain extent, overcome by the subsequent effect of the induction system pressure responsive potentiometer 94a in attempting to again raise this pressure. As previously explained, however, such a proportioning system inherently has a certain droop so that it is impossible for the induction system pressure responsive means to raise the pressure to the value previously assumed.

The potentiometer 552 is employed to determine the effect of potentiometer 553. The further the slider 556 is moved to the right, the greater will be the voltage that is impressed across resistor 557 and hence the greater will be the effect of potentiometer 553. By a proper selection of the position of slider 556 when the system is installed in an airplane, it is possible for the potentiometer 553 to exert such an effect that the manifold pressure is automatically reduced to the value desirable from the standpoint of engine operation.

The network 550c functions in connection with engine No. 4 in a manner identical to that described in connection with network 550. In other words, movement of the throttle lever 23b to the left to close throttle 16b causes a movement of slider 559c to the right to lower the setting of the induction system pressure means.

It will be seen from the above that with the system of Figure 3, it is possible to maintain the desired cabin pressures by use of the turbo superchargers for engines No. 2 and No. 3 while in no way affecting the engine performance adversely. As soon as the manifold pressure begins to rise above a value desirable for engine performance, the pilot retards the throttles for the No. 2 and No. 3 engines. This does two things. In the first place, it reduces the manifold pressure without reducing the induction system pressure, such as would otherwise happen if the compensating potentiometers 533 and 533b were not employed. At the same time, the induction system pressure in connection with engines No. 1 and No. 4 is automatically lowered so as to in turn lower the manifold pressure. Thus, the manifold pressure is simultaneously reduced, in connection with all four engines, the reduction being effected in each case in a manner most desirable from the standpoint of maintaining both the proper cabin pressure and the proper manifold pressure.

Conclusion

It will be seen that I have provided an improved pressure control system for an aircraft whereby the same superchargers are employed for both supplying compressed air to the engines and also to the cabins. It will further be seen that I have accomplished this without in any way interfering with either the maintenance of the desired pressure within the cabin or the desired manifold pressure for the engines.

While I have shown certain specific embodiments of my invention, it is to be understood that this is for purpose of illustration and that my invention is to be limited only by the scope of the appended claims.

I claim as my invention:

1. In an aircraft propelled by an internal combustion engine and having a cabin adapted to be maintained at a pressure normally higher than that of the surrounding atmosphere, means including a compressor for supplying compressed air to said engine, a motor driven by the exhaust gas from said engine for operating said compressor, means for conducting a portion of the air compressed by said compressor to said cabin to increase the pressure therein, means for controlling said motor normally to maintain the output of said compressor at a value sufficient to supply the necessary air to said engine, and limiting means for preventing said last named means maintaining the output of said compressor below a value sufficient to supply the necessary air to said cabin.

2. In an aircraft propelled by an internal combustion engine and having a cabin adapted to be maintained at a pressure normally higher than that of the surrounding atmosphere, a carburetor for supplying a mixture of fuel and air to said engine, means including a compressor for supplying compressed air to said carburetor, means for conducting a portion of the air compressed by said compressor to said cabin to increase the pressure therein, controlling means including a first device responsive to a condition affecting the pressure of the fuel mixture supplied to said engine for controlling said compressor, means for adjusting said controlling means so as to tend to cause the same to maintain said condition at a value desirable from the standpoint of engine operation, and means including a second device responsive to a condition affecting the need for air in said cabin for modifying the action of said controlling means so as to tend to cause the air pressure produced by said compressor to be sufficient to maintain the desired pressure condition within the cabin regardless of the setting of said adjusting means.

3. In an aircraft propelled by an internal combustion engine and having a cabin adapted to be maintained at a pressure normally higher than that of the surrounding atmosphere, a carburetor for supplying a mixture of fuel and air to said engine, means including a compressor for supplying compressed air to said carburetor, means for conducting a portion of the air compressed by said compressor to said cabin to increase the pressure therein, controlling means including a first device responsive to a condition affecting the pressure of the fuel mixture supplied to said engine for controlling said compressor, means for adjusting said controlling means so as to tend to cause the same to maintain said condition at a value desirable from the standpoint of engine operation, and means including a second device responsive to atmospheric pressure for modifying the action of said controlling means so as to tend to cause the air pressure produced by said compressor to be sufficient to maintain the desired pressure condition within the cabin regardless of the setting of said adjusting means.

4. In an aircraft propelled by an internal combustion engine and having a cabin adapted to be maintained at a pressure normally higher than that of the surrounding atmosphere, a carburetor for supplying a mixture of fuel and air to said engine, means including a compressor for supplying compressed air to said carburetor, means for conducting a portion of the air compressed by said compressor to said cabin to increase the pressure therein, controlling means including a first device responsive to a condition affecting the pressure of the fuel mixture supplied to said engine for controlling said compressor, means for adjusting said controlling means so as to tend to cause the same to maintain said condition at a value desirable from the standpoint of engine operation, and means including a second device responsive to cabin pressure for modifying the action of said controlling means so as to tend to cause the air pressure produced by said compressor to be sufficient to maintain the desired cabin pressure regardless of the setting of said adjusting means.

5. In an aircraft propelled by an internal combustion engine and having a cabin adapted to be maintained at a pressure normally higher than that of the surrounding atmosphere, a carburetor for supplying a mixture of fuel and air to said engine, means including a compressor for supplying compressed air to said carburetor and said for conducting a portion of the air compressed by said compressor to said cabin to increase the pressure therein, means for automatically controlling the flow of air through said cabin to maintain a desired pressure therein, controlling means including a first device responsive to a condition affecting the pressure of the fuel mixture supplied to said engine for controlling said compressor, means for adjusting said compressor controlling means so as to tend to cause the same to maintain said condition at a value desirable from the standpoint of engine operation, and means including a second device responsive to cabin pressure for modifying the action of said compressor controlling means so as to tend to cause the air pressure produced by said compressor to be sufficient to enable said cabin air flow controlling means to maintain the desired cabin pressure regardless of the setting of said adjusting means.

6. In an aircraft propelled by an internal combustion engine and having a cabin maintained at a pressure normally higher than that of the surrounding atmosphere, a carburetor for supplying a mixture of fuel and air to said engine, a compressor for supplying compressed air to said carburetor and to said cabin, means responsive to the pressure of the air supplied by said compressor for controlling the operation of said compressor, means responsive to a condition affecting cabin pressure for modifying the action of said previously named means to insure that the pressure of the air supplied by said compressor is adequate to maintain the proper cabin pressure, a throttle for controlling the flow of the fuel mixture to said engine, and means positioned by said throttle and effective when said throttle is moved towards closed position to cause an increase in the compressing effect of said compressor.

7. In an aircraft propelled by an internal combustion engine and having a cabin adapted to be maintained at a pressure normally higher than that of the surrounding atmosphere, a carburetor for supplying a mixture of fuel and air to said engine, means including a compressor for supplying compressed air to said carburetor and said cabin, a throttle for controlling the flow of the fuel mixture to said engine, means affected by the operation of said engine for driving said compressor, a control device for said driving means, means responsive to a condition affected by the pressure of the air supplied by said compressor for controlling said control device, and compensating means positioned by said throttle and effective upon said throttle being retarded to cause said control device to be moved in a direction tending to increase the output of the compressor and thus compensate for the decrease in the effect of said driving means for a given position of said control device resulting from the retarding of the throttle.

8. In an aircraft propelled by an internal combustion engine and having a cabin adapted to be maintained at a pressure normally higher than that of the surrounding atmosphere, a carburetor for supplying a mixture of fuel and air to said engine, means including a compressor for supplying compressed air to said carburetor and said cabin, a throttle for controlling the flow of the fuel mixture to said engine, a motor driven by the exhaust gas from said engine for driving said compressor, a control device for controlling the flow of exhaust gas through said motor, means responsive to a condition affected by the pressure of the air supplied by said compressor for controlling said control device, and compensating means positioned by said throttle and effective upon said throttle being retarded to cause said control device to be moved in a direction tending to increase the flow of gas through the motor and thus compensate for tendency of the flow of gas to decrease due to the retarding of the throttle.

9 In an aircraft propelled by an internal combustion engine and having a cabin adapted to be maintained at a pressure normally higher than that of the surrounding atmosphere, a carburetor for supplying a mixture of fuel and air to said engine, means including a compressor for supplying compressed air to said carburetor and said cabin, a throttle for controlling the flow of the fuel mixture to said engine, means affected by the operation of said engine for driving said compressor, a control device for said driving means, means responsive to the pressure of the air supplied by said compressor for controlling said control device, means for adjusting said last named means to enable the selection of a pressure suitable for engine operation, means responsive to a condition affecting the need for air in said cabin for preventing the selection of a pressure below that necessary to maintain desired pressure conditions in the cabin, and compensating means positioned by said throttle and effective upon said throttle being retarded to cause said control device to be moved in a direction tending to increase the output of the compressor and thus compensate for the decrease in the effect of said driving means for a given position of said control device resulting from the retarding of the throttle.

10. In an aircraft propelled by at least two internal combustion engines and having a cabin adapted to be maintained at a pressure normally higher than that of the surrounding atmosphere; each engine having associated therewith a carburetor, a compressor for supplying air under pressure to said carburetor, a throttle for controlling the flow of the fuel mixture from the carburetor to the engine, means affected by the operation of said engine for driving said compressor, a control device for said driving means, and means responsive to a condition affected by the output pressure of said compressor for controlling said control device in a modulating manner; the compressor of a first of said engines being connected to said cabin to supply air under pressure thereto; and compensating means positioned by the throttle of said first engine, said compensating means being effective upon said throttle being retarded to cause the control device for the motor of said first engine to move in a direction tending to increase the output of the compressor and to cause opposite movement of the control device of the other engine whose compressor is not employed to supply air to the cabin.

11. In an aircraft propelled by at least two internal combustion engines and having a cabin adapted to be maintained at a pressure normally higher than that of the surrounding atmosphere; each engine having associated therewith a carburetor, a compressor for supplying air under pressure to said carburetor, a throttle for controlling the flow of the fuel mixture from the carburetor to the engine, a motor driven by the exhaust gas from the engine for driving said compressor, a control device for controlling the flow of exhaust gas through said motor, and means responsive to a condition affected by the output pressure of said compressor for controlling said control device in a modulating manner; the compressor of a first of said engines being connected to said cabin to supply air under pressure thereto; and compensating means positioned by the throttle of said first engine, said compensating means being effective upon said throttle being retarded to cause the control device for the motor of said first engine to move in a direction tending to increase the flow of gas through the motor and to cause opposite movement of the control device of the other engine whose compressor is not employed to supply air to the cabin.

12. In an aircraft propelled by at least two internal combustion engines and having a cabin adapted to be maintained at a pressure normally higher than that of the surrounding atmosphere; each engine having associated therewith a carburetor, a compressor for supplying air under pressure to said carburetor, a throttle for controlling the flow of the fuel mixture from the carburetor to the engine, a motor driven by the exhaust gas from the engine for driving said compressor, a control device for controlling the flow of exhaust gas through said motor, and means responsive to a condition affected by the output pressure of said compressor for controlling said control device in a modulating manner; the compressor of a first of said engines being connected to said cabin to supply air under pressure thereto; a single means for adjusting the control means of all of said engines so as to cause each to tend to maintain a pressure condition desirable for engine operation, limiting means to prevent the selection of a pressure condition too low to insure the maintenance of a desired pressure within the cabin; and compensating means positioned by the throttle of said first engine, said compensating means being effective upon said throttle being retarded to cause the control device for the motor of said first engine to move in a direction tending to increase the flow of gas through the motor and to cause opposite movement of the control device of the other engine whose compressor is not employed to supply air to the cabin.

13. In an aircraft having a cabin adapted to be maintained at a pressure normally higher than that of the surrounding atmosphere, a source of air under pressure connected to said cabin, valve means controlling the flow of air through said cabin and hence controlling the pressure of the air in said cabin, controlling means including a condition responsive device for controlling the position of said valve means, and adjusting means for adjusting the effect of said controlling means, said adjusting means including a manually adjustable device and a timing device operative upon a change in the setting of said manually adjustable device to cause the adjusting means to change the effect of said controlling means at a predetermined rate to a value corresponding to the setting of said manually adjustable device.

14. In a control system for an enclosure adapted to be maintained at a pressure normally different from that of the surrounding atmosphere, a source of air under pressure connected to said enclosure, a valve means controlling the flow of air through said enclosure and hence controlling the pressure of the air in said enclosure, electrical controlling means including a condition responsive variable impedance for controlling the position of said valve means, and adjusting means for adjusting the effect of said controlling means at a timed rate and to a desired extent, said adjusting means including a further variable impedance operatively connected to said condition responsive variable impedance, a manually adjustable device, and a timing device operative upon a change in the setting of said manually adjustable device to cause the adjustment of said further variable impedance at a predetermined rate to a value corresponding to the setting of said manually adjustable device.

15. In an aircraft having a cabin adapted to be maintained at a pressure normally higher than that of the surrounding atmosphere, a source of air under pressure connected to said cabin, first controlling means for controlling the pressure of said source of air, valve means controlling the flow of air through said cabin and hence controlling the pressure of the air in said cabin, second controlling means including a condition responsive device for controlling the position of said valve means, and adjusting means for adjusting the effect of both said first and second controlling means, said adjusting means including a manually adjustable device and a timing device operative upon a change in the setting of said manually adjustable device to cause the adjusting means to change the effect of both said first and second controlling means at a predetermined rate to values corresponding to the setting of said manually adjustable device.

16. In an aircraft having a cabin adapted to be maintained at a pressure normally higher than that of the surrounding atmosphere, a source of air under pressure connected to said cabin, valve means controlling the flow of air through said cabin and hence controlling the pressure of the air in said cabin, controlling means including a condition responsive device for controlling the position of said valve means, and adjusting means for adjusting the effect of said controlling means and selecting a cabin pressure, and means including a device responsive to atmosphere pressure for preventing the selection of a cabin pressure lower than the surrounding atmosphere.

17. In an aircraft having a cabin adapted to be maintained at a pressure normally higher than that of the surrounding atmosphere, a source of air under pressure connected to said cabin, valve means controlling the flow of air through said cabin and hence controlling the pressure of the air in said cabin, controlling means including a condition responsive device for controlling the position of said valve means, and adjusting means for adjusting the effect of said controlling means, said adjusting means including a manually adjustable device and atmospheric pressure responsive means limiting the setting of said manually adjustable device to prevent said adjusting device from being moved to a position corresponding to a cabin pressure lower than that of the surrounding atmosphere.

18. In an aircraft having a cabin adapted to be maintained at a pressure normally higher than that of the surrounding atmosphere, a source of air under pressure connected to said cabin, valve means controlling the flow of air through said cabin and hence controlling the pressure of the air in said cabin, controlling means including a condition responsive device for controlling the position of said valve means, and adjusting means for adjusting the effect of said controlling means, said adjusting means including a manually adjustable device and a timing device operative upon a change in the setting of said manually adjustable device to cause the adjusting means to change the effect of said controlling means at a predetermined rate to a value corresponding to the setting of said manually adjustable device, and means including a device responsive to atmospheric pressure for limiting the movement of said mechanically adjustable device to prevent said adjusting device from being moved to a position corresponding to a cabin pressure lower than that of the surrounding atmosphere.

19. In control apparatus for an aircraft propelled by an internal combustion engine and having a cabin adapted to be maintained normally at a higher pressure than the surrounding atmosphere, said aircraft including a motor operated compressor and means for supplying air compressed by said compressor to both said engine and said chain; a motor for adjusting the compressing effect of said compressor, means including an impedance network for controlling said adjusting motor, said network including a first impedance responsive to a pressure condition affecting engine operation, and a second impedance responsive to a condition indicative of the pressure which is desirable to maintain in said cabin.

20. In control apparatus for an aircraft propelled by an internal combustion engine and having a cabin adapted to be maintained normally at a higher pressure than the surrounding atmosphere, said aircraft including a motor operated compressor and means for supplying air compressed by said compressor to both said engine and said cabin; a motor for adjusting the compressing effect of said compressor, controlling means including an impedance network for controlling said adjusting motor, said network including a first variable impedance variable in accordance with a pressure condition affecting engine operation, a manualy adjustable variable impedance for varying the pressure setting of said controlling means, and means including a variable impedance variable in accordance with a condition indicative of the pressure which is desirable to maintain in said cabin for limiting the adjusting effect of said manually adjustable impedance.

21. In control apparatus for an aircraft propelled by an internal combustion engine and having a cabin adapted to be maintained normally at a higher pressure than the surrounding atmosphere, said aircraft including a motor operated compressor and means for supplying air compressed by said compressor to both said engine and said cabin; a motor for adjusting the compressing effect of said compressor, means including an impedance network for controlling said adjusting motor, said network including a first variable impedance variable in accordance with a pressure condition affecting engine operation and a manually adjustable variable impedance for varying the pressure setting of said controlling means, a source of voltage, and means including a variable impedance variable in accordance with a condition indicative of the pressure which is desirable to maintain in said cabin for applying a variable portion of said source of voltage to said manually variable impedance to control the adjusting effect thereof.

22. In an aircraft propelled by an internal combustion engine and having a cabin adapted to be maintained normally at a higher pressure than the surrounding atmosphere, a motor operated compressor, means for supplying air compressed by said compressor to said engine and for diverting a portion of said air to said cabin, control means for controlling said motor operated compressor including means responsive to a condition affecting engine operation, and means responsive to the need for air in said cabin for adjusting said control means.

23. In an aircraft including an engine and having a cabin adapted to be maintained at a pressure normally higher than that of the surrounding atmosphere, means including a compressor for supplying compressed air to said engine, a motor driven by exhaust gas from said engine for operating said compressor, means for diverting a portion of the air compressed by said compressor to said cabin to increase the pressure therein, and means for controlling said motor including means responsive to the demand for air in said cabin.

24. In an aircraft having a heat operated propulsion means requiring relatively large quantities of air under superatmospheric pressure for combustion and having a cabin constructed and arranged to be maintained normally at a higher pressure than the surrounding atmosphere, a motor operated compressor for supplying said large quantities of air to said propulsion means, conduit means connecting said compressor to said propulsion means, air flow diverting means including a conduit connecting said compressor to said cabin, apparatus for controlling said compressor in response to a condition affecting the operation of said propulsion means, and control means responsive to a condition indicative of a need for air in said cabin arranged to modify the control exercised by said apparatus in a manner to require a predetermined operation of said compressor regardless of the air needs of said propulsion means.

25. In an aircraft having heat operated propulsion means requiring relatively large quantities of air under a pressure above that of the surrounding atmosphere and having a cabin constructed and arranged to be maintained at a higher pressure than the surrounding atmosphere, a power driven compressor for supplying said large quantities of air to said propulsion means, conduit means connecting said compressor to said propulsion means, relatively restricted air flow diverting means including a conduit connecting said compressor to said cabin, apparatus for controlling said compressor in response to a condition affecting the operation of said propulsion means, and control means responsive to a condition indicative of a need for air in said cabin arranged to control said compressor in a manner to satisfy the air requirements of the cabin, said control means and said apparatus being so connected and arranged that said compressor will be effectively controlled by either said control means or said apparatus depending upon which requires the highest pressure of air from said compressor.

26. In an aircraft propelled by a heat operated propulsion means requiring relatively large quantities of air under a pressure above that of the surrounding atmosphere and having a cabin constructed and arranged to be maintained at a pressure above that of said atmosphere, a carburetor for producing a mixture of fuel and air for said propulsion means, a compressor for supplying air to said carburetor, a motor driven by the exhaust gas from said engine for operating said compressor, a relatively restricted air diverting means including a conduit connecting said compressor to said cabin, manually adjustable means for controlling said motor to thus control the output of said compressor, and control means responsive to a condition indicative of a need for air in said cabin for controlling said motor in a manner to satisfy the air needs of said cabin, said control means being ineffective to control said motor when said adjustable means requires operation of said motor in excess of the operation required to meet the needs of said cabin.

27. In an aircraft propelled by an internal combustion engine and having a cabin constructed and arranged to be maintained at a higher pressure than the surrounding atmosphere, a motor operated compressor arranged to supply air to said engine, a conduit extending between said compressor and said cabin, flow restricting means in said conduit, apparatus for controlling said motor in accordance with the air requirements of said engine, control means for insuring sufficient operation of said compressor to meet the air needs of said cabin regardless of the air requirements of said engine, and means responsive to the differential of compressor discharge pressure and cabin pressure for controlling said flow restricting means to limit the flow of air to said cabin when the discharge pressure of said compressor exceeds the pressure required to meet the cabin requirements.

28. In an aircraft propelled by propulsion means requiring relatively large quantities of air at a higher pressure than that of the surrounding atmosphere and having a cabin constructed and arranged to be maintained at a higher pressure than that of said surrounding atmosphere, a power driven air compressor connected to said propulsion means for supplying said quantities of air, a conduit connecting said compressor to said cabin for diverting air to said cabin, means for controlling the operation of said compressor in accordance with the air requirements of said propulsion means, additional control means for insuring sufficient operation of said compressor to meet the air needs of said cabin, flow restricting means in said conduit, and means responsive to the average rate of flow through said conduit for controlling said flow restricting means to prevent an excess of air flowing to said cabin when said compressor is operating with a discharge pressure in excess of that required to meet cabin requirements.

HUBERT T. SPARROW.

(References on following page)

REFERENCES CITED

The following references are of record in the file of this patent:

UNITED STATES PATENTS

| Number | Name | Date |
|---|---|---|
| 1,508,731 | Standerwick | Sept. 16, 1924 |
| 2,002,057 | Gregg | May 21, 1935 |
| 2,119,402 | Puffer | May 31, 1938 |
| 2,265,461 | Wagner | Dec. 9, 1941 |
| 2,297,495 | Pfau | Sept. 29, 1942 |
| Re. 22,272 | Price | Feb. 16, 1943 |

Certificate of Correction

Patent No. 2,465,759.                                                                                           March 29, 1949.

HUBERT T. SPARROW

It is hereby certified that errors appear in the printed specification of the above numbered patent requiring correction as follows:

Column 25, line 59, for the reference numeral "41" read *441*; column 29, line 53, for "network 503b" read *network 530b*; column 34, line 27, claim 5, strike out "and said" and insert instead the comma and word *, means*; column 38, line 41, claim 19, for "chain" read *cabin*;

and that the said Letters Patent should be read with these corrections therein that the same may conform to the record of the case in the Patent Office.

Signed and sealed this 27th day of September, A. D. 1949.

[SEAL]

THOMAS F. MURPHY,
*Assistant Commissioner of Patents.*